(12) United States Patent
Rao et al.

(10) Patent No.: US 12,367,292 B2
(45) Date of Patent: Jul. 22, 2025

(54) PROVIDING USER-INDUCED VARIABLE IDENTIFICATION OF END-TO-END COMPUTING SYSTEM SECURITY IMPACT INFORMATION SYSTEMS AND METHODS

(71) Applicant: Citibank, N.A., New York, NY (US)

(72) Inventors: Prithvi Narayana Rao, Allen, TX (US); Pramod Goyal, Ahmedabad (IN)

(73) Assignee: CITIBANK, N.A., New York, NY (US)

( * ) Notice: Subject to any disclaimer, the term of this patent is extended or adjusted under 35 U.S.C. 154(b) by 54 days.

(21) Appl. No.: 18/399,422

(22) Filed: Dec. 28, 2023

(65) Prior Publication Data

US 2024/0403440 A1    Dec. 5, 2024

Related U.S. Application Data

(63) Continuation of application No. 18/327,040, filed on May 31, 2023, now Pat. No. 11,874,934, which is a
(Continued)

(51) Int. Cl.
  *G06F 21/57*    (2013.01)
  *G06F 21/55*    (2013.01)

(52) U.S. Cl.
  CPC .......... *G06F 21/577* (2013.01); *G06F 21/552* (2013.01)

(58) Field of Classification Search
  CPC .............................. G06F 21/577; G06F 21/552
  See application file for complete search history.

(56) References Cited

U.S. PATENT DOCUMENTS

| 8,380,817 B2 | 2/2013 | Okada |
| 8,387,020 B1 | 2/2013 | Maclachlan et al. |

(Continued)

FOREIGN PATENT DOCUMENTS

| WO | 2021160499 A1 | 8/2021 |
| WO | 2024020416 A1 | 1/2024 |

OTHER PUBLICATIONS

Aggarwal, Nitin , "Why measuring your new AI is essential to its succes", KPIs for gen AI: Why measuring your new AI is essential to its succes, 7 pages.
(Continued)

*Primary Examiner* — Stephen T Gundry
(74) *Attorney, Agent, or Firm* — Perkins Coie LLP

(57) ABSTRACT

Systems and methods for providing user-induced variable identification of end-to-end computing system security impact information via a user interface are disclosed. The system receives at a graphical user interface (GUI), a user calibration of a graphical security vulnerability element. The system then determines a set of computing system components that interact with data associated with the network operation based on a transmission of the network operation associated with a computing system. The system then determines a set of security vulnerabilities associated with each computing system component of the set of computing system components using a third-party resource. The system then applies a decision engine on the set of security vulnerabilities to determine a set of impacted computing-aspects associated with the set of computing system components. The system then generates for display a graphical representation of the set of impacted computing-aspects satisfying the security condition of the user calibration.

20 Claims, 13 Drawing Sheets

Related U.S. Application Data continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(56) References Cited

U.S. PATENT DOCUMENTS

| | | |
|---|---|---|
| 9,842,045 B2 | 12/2017 | Heorhiadi et al. |
| 10,620,988 B2 | 4/2020 | Lauderdale et al. |
| 10,943,067 B1 | 3/2021 | Brown et al. |
| 11,042,647 B1 | 6/2021 | Joyce et al. |
| 11,106,801 B1 | 8/2021 | Levine et al. |
| 11,133,942 B1 | 9/2021 | Griffin |
| 11,227,047 B1 | 1/2022 | Vashisht et al. |
| 11,227,187 B1 | 1/2022 | Weinberger |
| 11,328,068 B1 | 5/2022 | Niedzwiedz et al. |
| 11,410,136 B2 | 8/2022 | Cook et al. |
| 11,470,106 B1 | 10/2022 | Lin et al. |
| 11,503,075 B1 | 11/2022 | Sirianni et al. |
| 11,516,222 B1 | 11/2022 | Srinivasan et al. |
| 11,573,848 B2 | 2/2023 | Linck et al. |
| 11,652,839 B1 | 5/2023 | Aloisio et al. |
| 11,656,852 B2 | 5/2023 | Mazurskiy |
| 11,681,811 B1 | 6/2023 | Dixit |
| 11,683,333 B1 | 6/2023 | Dominessy et al. |
| 11,706,241 B1 | 7/2023 | Cross et al. |
| 11,720,686 B1 | 8/2023 | Cross et al. |
| 11,734,418 B1 | 8/2023 | Epstein |
| 11,741,226 B2 * | 8/2023 | Dixit ................. G06F 21/554 726/23 |
| 11,750,717 B2 | 9/2023 | Walsh et al. |
| 11,875,123 B1 | 1/2024 | Ben David et al. |
| 11,875,130 B1 | 1/2024 | Bosnjakovic et al. |
| 11,924,027 B1 | 3/2024 | Mysore et al. |
| 11,947,435 B2 | 4/2024 | Boulineau et al. |
| 11,960,515 B1 | 4/2024 | Pallakonda et al. |
| 11,983,806 B1 | 5/2024 | Ramesh et al. |
| 11,990,139 B1 | 5/2024 | Sandrew |
| 11,995,412 B1 | 5/2024 | Mishra |
| 12,001,463 B1 | 6/2024 | Pallakonda et al. |
| 12,026,599 B1 | 7/2024 | Lewis et al. |
| 12,028,368 B1 | 7/2024 | Cohen et al. |
| 12,107,869 B1 | 10/2024 | Kannan et al. |
| 12,135,949 B1 | 11/2024 | Cameron et al. |
| 12,149,553 B1 | 11/2024 | Fly et al. |
| 12,149,558 B1 | 11/2024 | Brown et al. |
| 12,155,781 B1 | 11/2024 | Helfgott et al. |
| 12,182,258 B2 | 12/2024 | Stokes et al. |
| 2003/0007178 A1 | 1/2003 | Jeyachandran et al. |
| 2004/0098454 A1 | 5/2004 | Trapp et al. |
| 2005/0204348 A1 | 9/2005 | Horning et al. |
| 2006/0095918 A1 | 5/2006 | Hirose |
| 2007/0067848 A1 | 3/2007 | Gustave et al. |
| 2010/0275263 A1 | 10/2010 | Bennett et al. |
| 2010/0313189 A1 | 12/2010 | Beretta et al. |
| 2014/0137257 A1 | 5/2014 | Martinez et al. |
| 2014/0258998 A1 | 9/2014 | Adl-tabatabai et al. |
| 2017/0061132 A1 | 3/2017 | Hovor et al. |
| 2017/0262164 A1 | 9/2017 | Jain et al. |
| 2017/0279826 A1 * | 9/2017 | Mohanty ................. G06F 9/505 |
| 2017/0295197 A1 | 10/2017 | Parimi et al. |
| 2018/0020021 A1 | 1/2018 | Gilmore et al. |
| 2018/0239903 A1 | 8/2018 | Bodin et al. |
| 2018/0343114 A1 | 11/2018 | Ben-ari |
| 2019/0188706 A1 | 6/2019 | Mccurtis |
| 2019/0236661 A1 | 8/2019 | Hogg et al. |
| 2019/0286816 A1 | 9/2019 | Fu |
| 2020/0012493 A1 | 1/2020 | Sagy |
| 2020/0074470 A1 | 3/2020 | Deshpande et al. |
| 2020/0153855 A1 | 5/2020 | Kirti et al. |
| 2020/0219009 A1 | 7/2020 | Dao et al. |
| 2020/0233979 A1 | 7/2020 | Tahmasebi Maraghoosh et al. |
| 2020/0259852 A1 | 8/2020 | Wolff et al. |
| 2020/0309767 A1 | 10/2020 | Loo et al. |
| 2020/0310866 A1 | 10/2020 | Varadaraj et al. |
| 2020/0314191 A1 | 10/2020 | Madhavan et al. |
| 2020/0349054 A1 | 11/2020 | Dai et al. |
| 2020/0380118 A1 | 12/2020 | Miller et al. |
| 2020/0387608 A1 | 12/2020 | Miller et al. |
| 2021/0049288 A1 | 2/2021 | Li |
| 2021/0089941 A1 | 3/2021 | Chen et al. |
| 2021/0133182 A1 | 5/2021 | Anderson et al. |
| 2021/0185094 A1 | 6/2021 | Waplington et al. |
| 2021/0211431 A1 | 7/2021 | Albero et al. |
| 2021/0256125 A1 | 8/2021 | Miller et al. |
| 2021/0264547 A1 | 8/2021 | Li |
| 2021/0273957 A1 * | 9/2021 | Boyer ................... G06F 21/554 |
| 2021/0390465 A1 | 12/2021 | Werder et al. |
| 2022/0050928 A1 | 2/2022 | Shukla et al. |
| 2022/0114251 A1 | 4/2022 | Guim Bernat et al. |
| 2022/0114399 A1 | 4/2022 | Castiglione et al. |
| 2022/0147636 A1 | 5/2022 | Mahuli et al. |
| 2022/0164732 A1 * | 5/2022 | Brannon ............. G06F 21/6245 |
| 2022/0166789 A1 * | 5/2022 | Murray ............... H04L 63/1416 |
| 2022/0188460 A1 * | 6/2022 | Hadar ..................... H04L 41/22 |
| 2022/0191236 A1 * | 6/2022 | Henderson ............ G06F 40/177 |
| 2022/0198304 A1 | 6/2022 | Szczepanik et al. |
| 2022/0201042 A1 * | 6/2022 | Crabtree ............. G06F 16/2477 |
| 2022/0210200 A1 * | 6/2022 | Crabtree ............... G06F 16/951 |
| 2022/0210202 A1 * | 6/2022 | Crabtree ............. G06F 16/2477 |
| 2022/0222089 A1 * | 7/2022 | Joshi ..................... G06F 16/953 |
| 2022/0224702 A1 * | 7/2022 | Dherange .......... H04L 63/1433 |
| 2022/0224723 A1 * | 7/2022 | Crabtree ............. H04L 63/1441 |
| 2022/0237565 A1 * | 7/2022 | Dzierzanowski .... G06Q 30/018 |
| 2022/0263843 A1 * | 8/2022 | Aslam ................... H04L 43/045 |
| 2022/0263855 A1 * | 8/2022 | Engelberg ................ G06N 5/04 |
| 2022/0263860 A1 * | 8/2022 | Crabtree ............. H04L 63/1425 |
| 2022/0278889 A1 * | 9/2022 | Malleshaiah .......... H04L 67/51 |
| 2022/0286438 A1 | 9/2022 | Burke et al. |
| 2022/0286474 A1 * | 9/2022 | Kuppa .................. H04L 63/145 |
| 2022/0294789 A1 | 9/2022 | Tikhomirov et al. |
| 2022/0294810 A1 * | 9/2022 | Tyagi ................. H04L 63/1433 |
| 2022/0303295 A1 | 9/2022 | Erlingsson et al. |
| 2022/0303300 A1 * | 9/2022 | Egan ................. H04L 63/1416 |
| 2022/0303302 A1 | 9/2022 | Hwang et al. |
| 2022/0303352 A1 * | 9/2022 | Herzog ................. G06N 20/00 |
| 2022/0311681 A1 | 9/2022 | Palladino et al. |
| 2022/0318654 A1 | 10/2022 | Lin et al. |
| 2022/0327620 A1 | 10/2022 | Ndoutoumou |
| 2022/0334818 A1 | 10/2022 | Mcfarland |
| 2022/0342846 A1 | 10/2022 | Kunchakarra et al. |
| 2022/0345457 A1 | 10/2022 | Jeffords et al. |
| 2022/0368728 A1 | 11/2022 | Murray et al. |
| 2022/0377093 A1 | 11/2022 | Crabtree et al. |
| 2022/0398149 A1 | 12/2022 | Mcfarland et al. |
| 2022/0400135 A1 | 12/2022 | Gamra |
| 2022/0405397 A1 | 12/2022 | Golan et al. |
| 2022/0414213 A1 | 12/2022 | Dixit |
| 2022/0417274 A1 | 12/2022 | Madanahalli et al. |
| 2023/0007039 A1 | 1/2023 | Waplington |
| 2023/0009999 A1 | 1/2023 | Higuchi et al. |
| 2023/0019072 A1 | 1/2023 | Okunlola |
| 2023/0032686 A1 | 2/2023 | Williams et al. |
| 2023/0033317 A1 | 2/2023 | Lin et al. |
| 2023/0035321 A1 | 2/2023 | Vijayaraghavan |
| 2023/0039855 A1 | 2/2023 | Greene |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0077527 A1 | 3/2023 | Sarkar |
| 2023/0113621 A1 | 4/2023 | Griffin et al. |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0148116 A1 | 5/2023 | Stokes et al. |
| 2023/0164158 A1 | 5/2023 | Fellows et al. |
| 2023/0169397 A1 | 6/2023 | Smith et al. |
| 2023/0171282 A1 | 6/2023 | Bollinger |

(56) References Cited

U.S. PATENT DOCUMENTS

| | | |
|---|---|---|
| 2023/0177613 A1 | 6/2023 | Crabtree et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0259860 A1 | 8/2023 | Sarkar |
| 2023/0269272 A1 | 8/2023 | Dambrot et al. |
| 2023/0274003 A1 | 8/2023 | Liu et al. |
| 2023/0359789 A1 | 11/2023 | Andre et al. |
| 2023/0362200 A1 | 11/2023 | Crabtree et al. |
| 2023/0396641 A1 | 12/2023 | Hebbagodi et al. |
| 2023/0412635 A1 | 12/2023 | Binyamini et al. |
| 2024/0020538 A1 | 1/2024 | Socher et al. |
| 2024/0037245 A1 | 2/2024 | Kahan et al. |
| 2024/0054233 A1 | 2/2024 | Ohayon et al. |
| 2024/0054249 A1 | 2/2024 | Loubet Moundi et al. |
| 2024/0095077 A1 | 3/2024 | Singh et al. |
| 2024/0129345 A1 | 4/2024 | Kassam et al. |
| 2024/0256678 A1 | 8/2024 | Thompson |
| 2024/0323202 A1 | 9/2024 | Niv et al. |
| 2024/0333743 A1 | 10/2024 | Bazalgette et al. |
| 2024/0333753 A1 | 10/2024 | Cross et al. |
| 2024/0340301 A1 | 10/2024 | Thompson |
| 2024/0340302 A1 | 10/2024 | Wang et al. |
| 2024/0346151 A1 | 10/2024 | Goswami et al. |
| 2024/0356984 A1 | 10/2024 | Gamra |
| 2024/0356986 A1 | 10/2024 | Crabtree et al. |
| 2024/0364725 A1 | 10/2024 | Sinha et al. |
| 2024/0364749 A1 | 10/2024 | Crabtree et al. |
| 2024/0403420 A1 | 12/2024 | Lal et al. |
| 2024/0403428 A1 | 12/2024 | Lal et al. |
| 2024/0403437 A1 | 12/2024 | Szigeti et al. |
| 2024/0403445 A1 | 12/2024 | Straub et al. |
| 2024/0406145 A1 | 12/2024 | Crabtree et al. |
| 2024/0411896 A1 | 12/2024 | Myers et al. |
| 2024/0414191 A1 | 12/2024 | Humphrey et al. |
| 2024/0414211 A1 | 12/2024 | Boyer et al. |
| 2025/0005167 A1 | 1/2025 | Millar et al. |
| 2025/0013753 A1 | 1/2025 | Conway |
| 2025/0021464 A1 | 1/2025 | Lang et al. |

OTHER PUBLICATIONS

AI, "What is AI Verify?", What is AI Verify—AI Verify Foundation.

Altman, Sam, "Sam Altman Admits That OpenAI Doesn't Actually Understand How Its AI Works", Sam Altman Admits That OpenAI Doesn't Actually Understand How Its AI Works—"We certainly have not solved interpretability.", 4 pages.

Shah, Harshay, "Decomposing and Editing Predictions by Modeling Model Computation", Decomposing and Editing Predictions by Modeling Model Computation, 5 pages.

Empower Your Team with a Compliance Co-Pilot, Sedric, retrieved on Sep. 25, 2024. https://www.sedric.ai/.

Cranium, Adopt & Accelerate AI Safely, retrieved on Nov. 7, 2024, from https://cranium.ai/.

Farris, K., A., et al., "Vulcon: A System for Vulnerability Prioritization, Mitigation, and Management," ACM Transactions on Privacy and Security, vol. 21, No. 4, Article 16. Publication date: Jun. 2018, 28 pages.

Generative machine learning models; IPCCOM000272835D, Aug. 17, 2023. (Year: 2023).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Mathews, A. W., "What AI Can Do in Healthcare—and What It Should Never Do," The Wall Street Journal, published on Aug. 21, 2024, retrieved on Sep. 5, 2024 https://www.wsj.com.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

AI Risk Management Framework NIST, retrieved on Jun. 17, 2024, https://www.nist.gov/itl/ai-risk-management-framework.

Independent analysis of AI language models and API providers. Artificial Analysis, retrieved on Jun. 13, 2024, https://artificialanalysis.ai/, 11 pages.

Brown, D., et al., "The Great AI Challenge: We Test Five Top Bots on Useful, Everyday Skills," The Wall Street Journal, published May 25, 2024.

Dong, Y., et al., "Building Guardrails for Large Language Models," https://ar5iv.labs.arxiv.org/html/2402.01822v1, published May 29, 2024, 20 pages.

International Search Report and Written Opinion Received received in Application No. PCT/US23/85942, dated Feb. 15, 2024, 6 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Mavrepis, P., et al., "XAI for All: Can Large Language Models Simplify Explainable AI?," https://arxiv.org/abs/2401.13110, Jan. 23, 2024, 10 pages.

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv. /abs/2409.10102.

Aggarwal, Nitin, "Why measuring your new AI is essential to its succes", KPIs for gen AI: Why measuring your new AI is essential to its succes, 7 pages, Jun. 11, 2024.

AI, "What is AI Verify?", What is AI Verify—AI Verify Foundation, Jun. 11, 2024.

Altman, Sam, "Sam Altman Admits That OpenAI Doesn't Actually Understand How Its AI Works", Sam Altman Admits That OpenAI Doesn't Actually Understand How Its AI Works—"We certainly have not solved interpretability.", 4 pages, Jun. 11, 2024.

Anthrop/C, "Mapping the Mind of a Large Language Model", Mapping the Mind of a Large Language Model, May 21, 2024.

Claburn, Thomas, "OpenAI's GPT-4 can exploit real vulnerabilities by reading security advisories", OpenAI's GPT-4 can exploit real vulnerabilities by reading security advisories, Apr. 17, 2024, 3 pages.

Marshall, Andrew, "Threat Modeling AI/ML Systems and Dependencies", Threat Modeling AI/ML Systems and Dependencies, Nov. 2, 2022, 27 pages.

Roose, Kevin, "A.I. Has a Measurement Problem", A.I. Has a Measurement Problem, Apr. 15, 2024, 5 pages.

Roose, Kevin, "A.I.'s Black Boxes Just Got a Little Less Mysterious", A.I.'s Black Boxes Just Got a Little Less Mysterious, May 21, 2024, 5 pages.

Shah, Harshay, "Decomposing and Editing Predictions by Modeling Model Computation", Decomposing and Editing Predictions by Modeling Model Computation, 5 pages, Jun. 11, 2024.

Shankar, Ram, "Failure Modes in Machine Learning", , Nov. 2019, 14 pages.

Teo, Josephine, "Singapore launches Project Moonshot", Singapore launches Project Moonshot—a generative Artificial Intelligence testing toolkit to address LLM safety and security challenges, May 31, 2024, 8 pages.

Coalition for Content Provenance and Authenticity, Contents Credentials C2PA Technological Specification, v2.1,Sep. 20, 2024. (Year: 2024).

(56) References Cited

OTHER PUBLICATIONS

Stokes, et al. "Preventing Machine Learning Poisoning Attacks Using Authentication and Provenance", MILCOM 2021—2021 IEEE Military Communications Conference (MILCOM), 2021, pp. 181-188. (Year: 2021).

* cited by examiner

PROVIDING USER-INDUCED VARIABLE IDENTIFICATION OF END-TO-END COMPUTING SYSTEM SECURITY IMPACT INFORMATION SYSTEMS AND METHODS

CROSS-REFERENCE TO RELATED APPLICATION(S)

This application is a continuation of U.S. patent application Ser. No. 18/327,040 entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications are incorporated herein by reference in its entirety.

BACKGROUND

When determining whether a computing platform (e.g., a cloud-based computing platform, a mobile computing platform, a remote computing platform) or computing system is secure (e.g., safe to use), network engineers often rely on publicly available information regarding the computing platforms and systems. However, this publicly available information can be filled with inaccuracies and may be outdated. For example, network engineers may be responsible for choosing the safest, fastest, and most scalable computing platform to provide services to another system. Of these factors, security of the computing platforms is of upmost importance as user data can be processed on such computing platforms and may be susceptible to a data breach if user data is not handled properly. As new security vulnerabilities are discovered by attackers in real-time, such vulnerabilities may be exploited and network engineers relying on publicly available information regarding the security of a computing platform may be unaware of the newly discovered security vulnerabilities as they are not published in the public domain.

Moreover, network engineers employing manual techniques to determine whether the given computing platform or system is impacted by one or more security vulnerabilities often leads to errors and is based on subjective opinion of the engineer. As data relied upon for making such determinations takes time to publish, attackers may exploit user and system data in real-time. Additionally, although such engineers may subjectively determine security vulnerabilities of a given system, determining which vulnerabilities are most threatening is further complicated by differing opinions of network engineers. As a large amount of time and other resources devoted to correcting security vulnerabilities, where network engineers disagree on which vulnerabilities should be corrected first, the computing platform and/or system may continue to be exploited. Moreover, the advent of artificial intelligence can be used maliciously, which attackers leverage to prevent detections of new threats (e.g., via masking computing platform/system updates) that cause advanced techniques to detect advanced threats. Without a way to determine whether a given computing platform is secure at a given moment in time and which vulnerabilities are to be corrected over others, user data may be stolen, system data may be held for ransom, and computing networks may be injected with malicious software unbeknownst to the network engineers until it is too late. These and other drawbacks exist.

Figure 1:
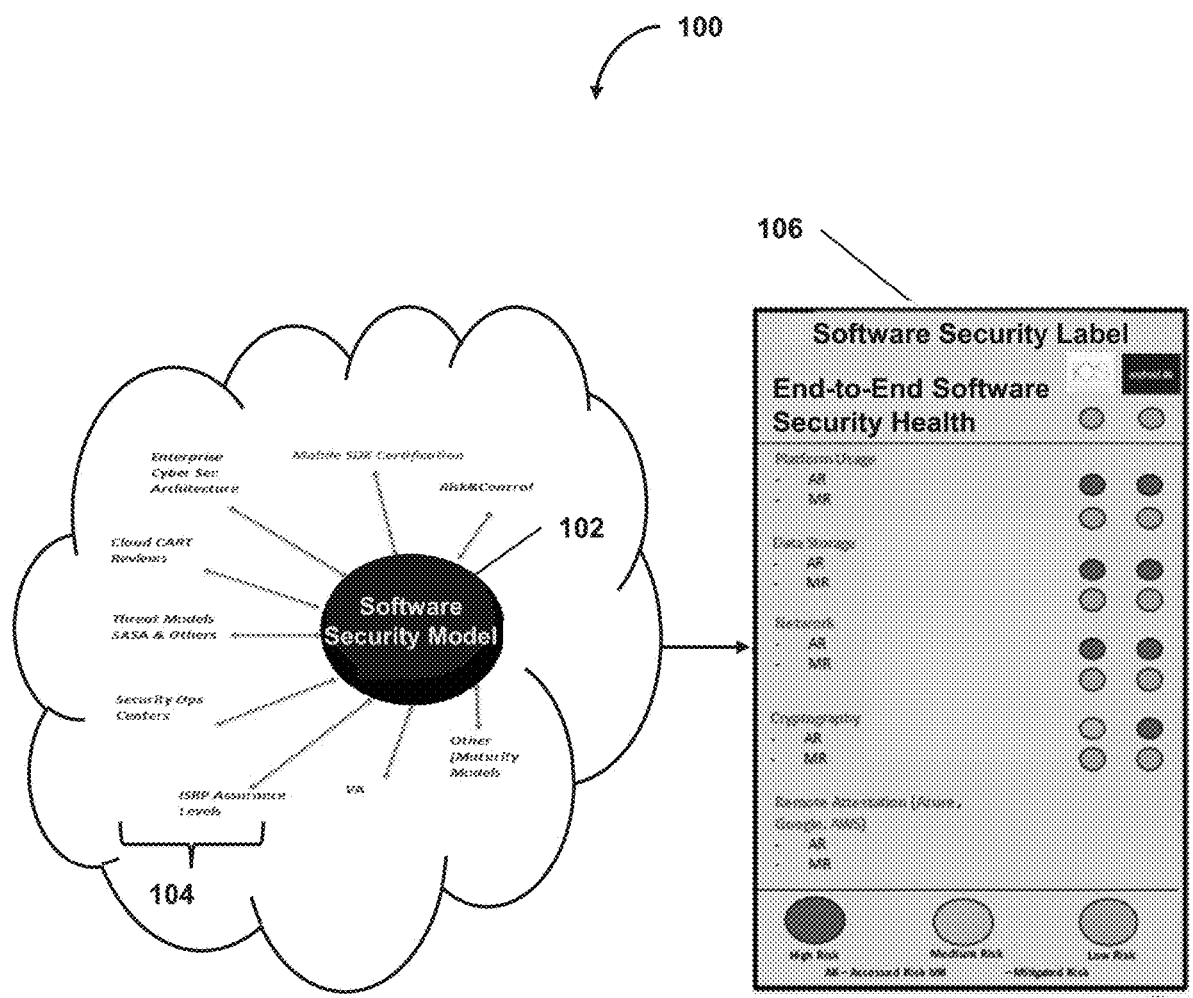
FIG. 1 is an illustrative diagram showing an illustration of a logical component used to determine platform-specific end-to-end security vulnerabilities for a software application and a graphical layout for displaying the platform-specific end-to-end security vulnerabilities for the software application via a Graphical User Interface (GUI), in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Given the complexity of differing security vulnerability threat vectors included in security vulnerability descriptions, end-users of software applications are often unable to determine whether a particular software application is secure or otherwise safe to use. For example, end-users often take for granted that an application made available from a trusted entity (e.g., service provider, software developer, corporation, company, etc.) does not include security vulnerabilities that may make the user's sensitive data prone to a data leak, man-in-the-middle attack, or other security vulnerabilities/attacks. However, as malicious entities continue to test these software applications and the computing platforms or systems that interact with such applications by penetration testing or other security exploit discovery techniques, oftentimes such malicious entities discover new security vulnerabilities and may exploit them leaving user data prone to being stolen. As such, end-users of software applications may not have accurate or up-to-date information as to whether a software application they intend to use is impacted by a security vulnerability as attackers are continually implementing newly discovered exploits in real-time or near real-time.

Additionally, although software development teams developing software applications for end-users typically test their applications for such security vulnerabilities, these testing methods are generally limited due to time and cost. This combined with platform updates (e.g., cloud-based service provider updates, operating system updates, or other platform-related updates) often create/uncover new security vulnerabilities. Although third-party security entities may provide information related to newly discovered cybersecurity threats (e.g., security vulnerabilities, threat vectors, method of possible attack, etc.), such information is often generic and not specific to a given software application being executed on a given platform. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform.

Another common issue faced by network engineers is with respect to the security of one or more computing system platforms, such as cloud-based computing system platforms (e.g., cloud-based service providers, cloud computing systems), mobile application platforms (e.g., iOS, Android, Windows), or other computing environments and their interactions with each other. For example, due to the complexity of current computing system architecture involving multiple computing system platforms being interconnected, selecting a computing system platforms to build a robust architecture for processing user data is a difficult task given the plethora of security vulnerabilities may be associated with each computing system platform. For instance, when selecting such computing system platforms that may process user data that is transferred from a mobile application of a mobile computing system platform to a cloud-based computing system platform, the network engineer must be aware of security vulnerabilities of each computing system platform. A large level of trust is often involved when selecting computing system platforms and network engineers must currently manually select which computing system platform to choose based on their opinion and what security-related information is available. However, such security information can be unreliable or outdated as new security vulnerabilities are discovered in real-time and/or masked via malicious use of AI, leading to a potential data leak of user data.

As yet another common issue faced by network engineers is with respect to providing accurate indications of security impact information of end-to-end computing systems. For example, in addition to the complexity of current computing system architectures, one security vulnerability present on a given computing component (e.g., a firewall, load balancer, server, etc.) may be associated or otherwise impact another security vulnerability present on another component (or the same component). Network engineers relying on their subjective opinion have no mechanism to accurately and consistently determine which security vulnerabilities are to be attended to over others, which security vulnerabilities impact other vulnerabilities, or which security vulnerabilities are most threatening or detrimental to user and system data. Although network engineers may perform research and rely on publicly available data concerning security vulnerabilities, updates to hardware or software within a computing system architecture may be updated, nullifying or rather amplifying the threat a given security vulnerability poses. Moreover, a network engineer may want to see at a higher level, which aspects of the computing system may be impacted by security vulnerabilities. For example, although security-vulnerability information may be directed to a single computing system component, that component may be part of a bigger picture (e.g., an aspect, category, or other class of computing system architecture). With no current mechanism to enable users (e.g., network engineers) to quickly and efficiently discover the most threatening security vulnerabilities and which aspects of an end-to-end computing system are impacted, delays in tending to security vulnerabilities may occur.

There is a need for determining, with respect to a given platform and the software being executed on the platform, how specific computing aspects (e.g., assessment domains) are impacted by a particular security vulnerability (or threat vector). There is a further need to convey this information in a user-friendly environment such that end-users are able to quickly and accurately determine whether a software application is safe to use. Moreover, there is a need to predict which computing aspects are impacted by security vulnerabilities (e.g., current security vulnerabilities or future security vulnerabilities) in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

The inventors have further developed an improved method for determining comparative real-time end-to-end security vulnerabilities with respect to different infrastructure/architecture components, such as different cloud-based computing platforms, mobile computing system platforms, or other computing system environment components. The method determines a set of computing aspects associated with each respective component being compared (e.g., each cloud-based computing system platform) which can process a network operation in real-time (or near real-time). Using security-specification data and security vulnerability information associated with each component being compared, the system can determine computing-aspect impact levels compared to a comparative standard component being compared (e.g., a standard cloud-based computing system, a model cloud-based computing system, a guideline cloud-based computing system) to generate visual indications of each computing-aspect impact levels for each respective component to enable an easy identification of which component (e.g., cloud-based computing system) to choose. As such, by generating such visual indications, network engineers may select the "best" computing system platform based on up-to-date security vulnerability information to address user-specific requirements, such as to reduce the chance of a data breach of user data.

Due to the sheer number of variations of computing system platform-related security vulnerability information, there is a large amount of time spent attempting to identify how respective computing aspects are impacted by these complex combinations. For example, the hardware and software components that are associated with a given computing system platform may each be associated with their own respective security vulnerabilities which must be considered individually as well as how they impact one another when integrated with other computing system platforms. Furthermore, computer processing and memory resources are often wasted trying to identify how these computing aspects are impacted as existing systems and methods often rely on the software developer to perform hours-worth of research on the Internet, which leads to an increase in network traffic, an increase in computing memory required to process such requests, and wastes computer processing resources that could otherwise be available for other tasks, such as software development.

Additionally, as security vulnerabilities may be discovered in real-time by attackers, penetration testers, or hackers, security vulnerability information can be outdated, leading to the unidentified security vulnerabilities propagating throughout a given platform (e.g., a cloud-based computing system platform, cloud-based service provider, software application, mobile computing system platform, or other computing environment) for a long period of time, causing user data to be prone to a data breach or malicious software being installed to affect secure systems. Moreover, even when information is obtained with respect to each software application, platforms the software applications are executed on, the hardware and software components that control (or otherwise associated with the functions related to the software application), and the security vulnerabilities (e.g., of the hardware components, software components, and the platform), such information is often not in an easily understood format that may provide an overall "picture" of the end-to-end software application "health." This may lead to the software developer and/or end-user to misinterpret or simply miss any identified security vulnerabilities with respect to the software application due to the plethora of information. Thus, by optimizing the process in which specific computing aspects are identified in relation to a software application being executed on a given platform, determining a level of impact for each computing aspect, and providing a visual indication of such impact levels, the amount of computer processing and memory resources are decreased, as well as improving an end-user's understanding of the security of a software application they intend to use.

The inventors have further developed an improved method and system for providing user-driven variable identification of end-to-end computing system security impact information via a user interface. The system receives a user calibration of a graphical security vulnerability element to enable a user (e.g., a network engineer, end-user, or other user) to adjust a security condition related to identifying impacted computing aspects of computing system threats. Based on a transmission of a network operation associated with a computing system, the system determines computing system components (e.g., of a computing system architecture, computing system platform, etc.) that interacts with data associated with the network operation. By identifying the computing system components that interact with data of the network operation, the system obtains real-time information indicating which computing system components are being utilized within the given computing system/platform/architecture.

Using a third-party resource (e.g., a third-party security entity), the system determines a set of security vulnerabilities associated with each computing system component of the set of computing system components. For instance, as the system obtains the set of currently utilized computing system components, accurate security vulnerability information may be obtained regarding currently implemented computing architecture components, thereby ensuring the system utilized the most accurate and up-to-date information. A decision engine may be applied on the set of security vulnerabilities to generate a set of impacted computing-aspects associated with the set of computing system components. By generating the impacted computing-aspects by using a decision engine applied on the set of security vulnerabilities, the system reduces the amount of wasted computing memory and processing resources by processing security vulnerabilities that are known to be current with respect to the components of the computing system. Using the set of impacted computing-aspects, the system generates for display at a graphical user interface a graphical representation of the set of impacted computing-aspects that satisfy the security condition of the user calibration. By displaying, the set of impacted computing-aspects enable users (e.g., network engineers) to be provided with a bigger picture of which aspects (e.g., assessment domains) are most impacted by one or more security vulnerabilities, thereby improving the user experience. Moreover, by displaying the set of impacted computing aspects that satisfy the security condition, users are enabled to view only computing aspects that adhere to a given, user-selectable, security condition (e.g., a given impact level, a given set of computing-aspects, etc.), thereby reducing computer processing and memory resources while improving the user experience.

In various implementations, the methods and systems described herein can generate an improved graphical layout indicating computing-aspect-specific impact levels (e.g., as related to a software application and the platform the software application is being executed on) to indicate to an end-user a security profile associated with a software application in real-time. For example, a computing-aspect-mapping structure can be used to identify a set of computing aspects associated with a software application and the platform that the software application is being executed on. A set of security-vulnerability descriptions related to the platform (e.g., obtained by a security entity) is then obtained to determine a threat value for each security-vulnerability descriptions by using a platform-specific policy that indicates security impact information related to the security-vulnerability descriptions. Computing aspect impact levels for each computing aspect associated with the platform can be determined using the determined threat value for each security-vulnerability description. A graphical layout can then be displayed at a user interface, where the graphical layout comprises a graphical representation of each computing aspect impact level of each respective computing aspect of the set of computing aspects associated with the platform.

In various implementations, the methods and systems described herein can generate an improved graphical layout indicating overall-computing aspect impact levels for associated computing aspects of one computing system platform with respect to a comparative computing system platform to indicate to a user (e.g., end-user, network engineer, or system administrator) that a given computing system platform is secure. For example, the system can detect a user interaction at a webpage for a network operation, where the network operation indicates a processing of data from one computing system platform to a set of other computing system platforms. The system can determine a first set of computing aspects associated with each computing system platform of the set of computing system platforms (e.g., the other computing system platforms) based on the processing of the network operation to obtain security-related information in real-time (or near real-time). The system then identifies a set of comparative computing system platform computing aspects (e.g., to compare each computing system platform to) to determine how one computing system platform "measures up" to a standard computing system platform. The system can then determine overall-computing aspect impact level for associated (e.g., corresponding, matching, or otherwise similar) computing aspects of the comparative computing system platform computing aspects. The system can then generate at a GUI, a graphical layout indicating a graphical representation of each computing aspect impact level for each respective computing system platforms' computing aspect of the set of computing aspects to enable users to easily identify that a given computing system platform is secure and safe to use.

In various implementations, the methods and systems described herein can provide user-induced variable identification of end-to-end computing system security impact information via a user interface. For example, the system can receiving, at a graphical user interface (GUI), a user calibration of a graphical security vulnerability element, where the user calibration adjusts the graphical security vulnerability element to a position indicative of a security condition related to identifying impacted computing aspects of computing system threats. The system can determine, based on a transmission of a network operation associated with a computing system, a set of computing system components that interact with data associated with the network operation. The system can determine a set of security vulnerabilities associated with each computing system component of the set of computing system components using a third-party resource. The system can apply a decision engine to generate a set of impacted computing-aspects associated with the set of computing system components using the set of security vulnerabilities. The system can generate display at the GUI, a graphical representation of the set of impacted computing-aspects satisfying the security condition of the user calibration.

It should be noted, that although the following description may describe comparison of a set of cloud-based computing system platforms to a comparative cloud-based computing system platform, that other types of computing system platforms may be compared to a comparative system platform. For example, a set of mobile computing system platforms may be compared to a comparative mobile computing system platform, a set of remote computing system platforms may be compared to a comparative remote computing system platform, a set of hardware platforms may be compared to a comparative hardware platform, a set of operating systems may be compared to a comparative operating system, or the like. A person skilled in the art will appreciate that the invention, as described herein, may apply to other computing system platforms, components, and architectures.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application—and/or processing—related data. Logical component 102 can analyze data received from agents 104 and generate a software security label for an end-user (e.g., a user, customer, unskilled user) to convey in an easily understood format whether a software application is safe to use. In some implementations, agents 104 can be a variety of data sources. For example, agents 104 can represent data obtained from one or more third parties (e.g., third-party security entities). Such third-party data sources may represent industry trusted globally accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

Suitable Computing Environments

Figure 2:
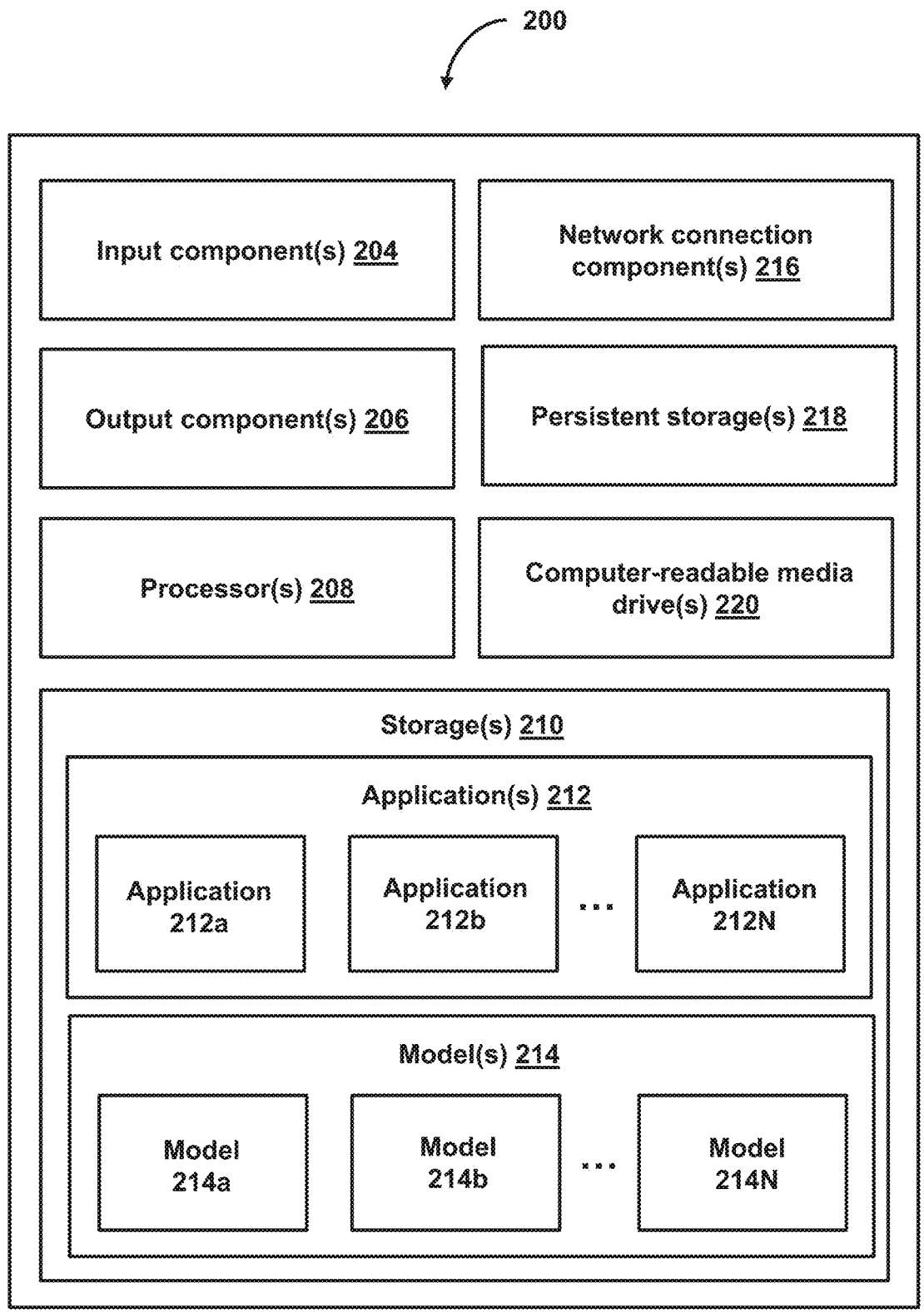
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
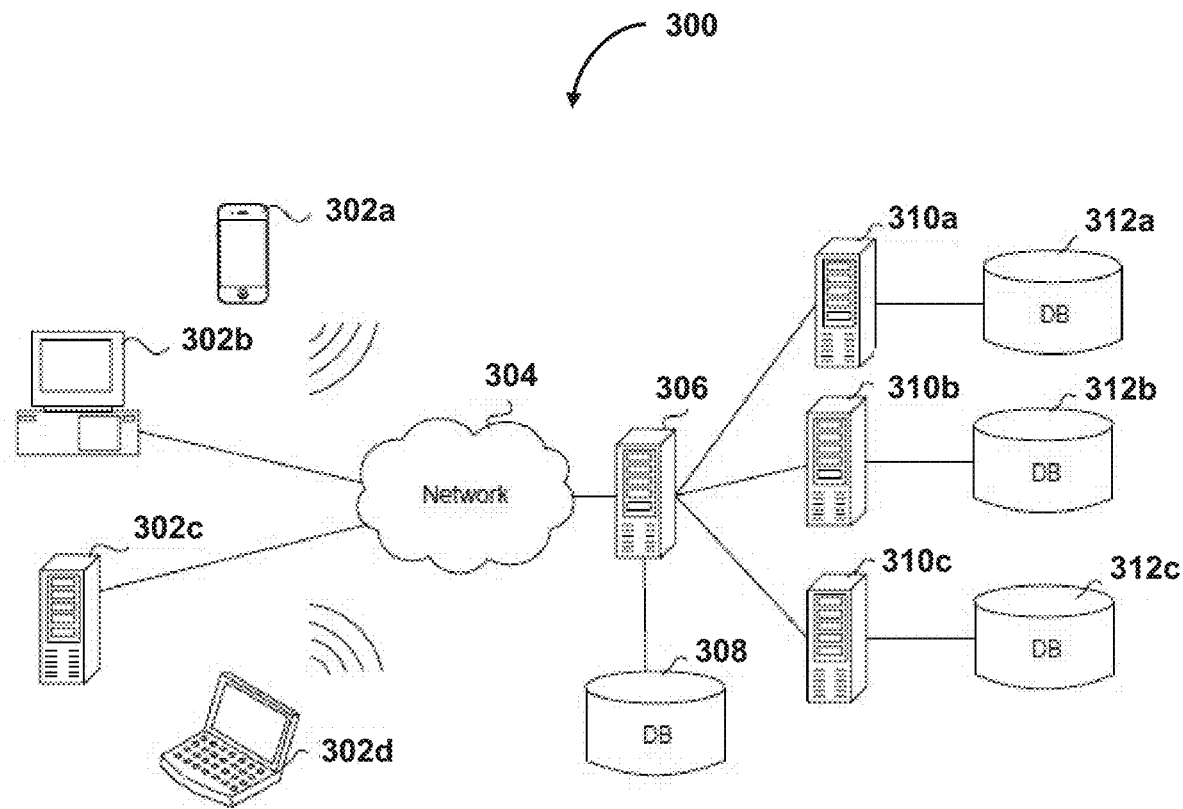
FIG. 3 is a system diagram illustrating an example of a computing environment in which the disclosed system operates in some implementations of the present technology.

FIG. 3 is a system diagram illustrating an example of a computing environment in which the disclosed system operates in some implementation. In some implementations, environment 300 includes one or more client computing devices 302a-d, examples of which can host the system 100. For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems, such as the system 100. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server 310 can correspond to a group of servers, and each of these servers can share a database or can have its own database. Databases 308 and 312 warehouse (e.g., store) information such model data, training data, test data, validation data, one or more machine learning models, predefined ranges, predefined thresholds, error thresholds, graphical representations, computing-aspect-mapping structures (e.g., assessment-domain-mapping data structure), data structures, platform identifiers, software application identifiers, security-vulnerability descriptions (e.g., security-vulnerability responses, security threats, security attack vectors, tactics, techniques, and procedures), computing-aspect identifiers (e.g., assessment-domain identifiers), platform-specific policies, mathematical formulas (e.g., weighted average, weighted sum, or other mathematical formulas), graphical elements (e.g., colors, shapes, text, images, multimedia), system protection mechanisms, networking routes, network processing routes, mitigated threat values, mitigated-computing-aspect-impact levels, computing-aspect-specific-impact levels, industry standard scoring standards, predetermined security threat values, received agent 104 information (FIG. 1), or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), decision engines, rules engines, Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 4). The training data or training set can be created by generating pairs of features (e.g., feature vectors) and/or ground-truth labels/values based on any of the data stored in databases 308 and 312. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 308 and 312 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Machine Learning Model(s)

Figure 4:
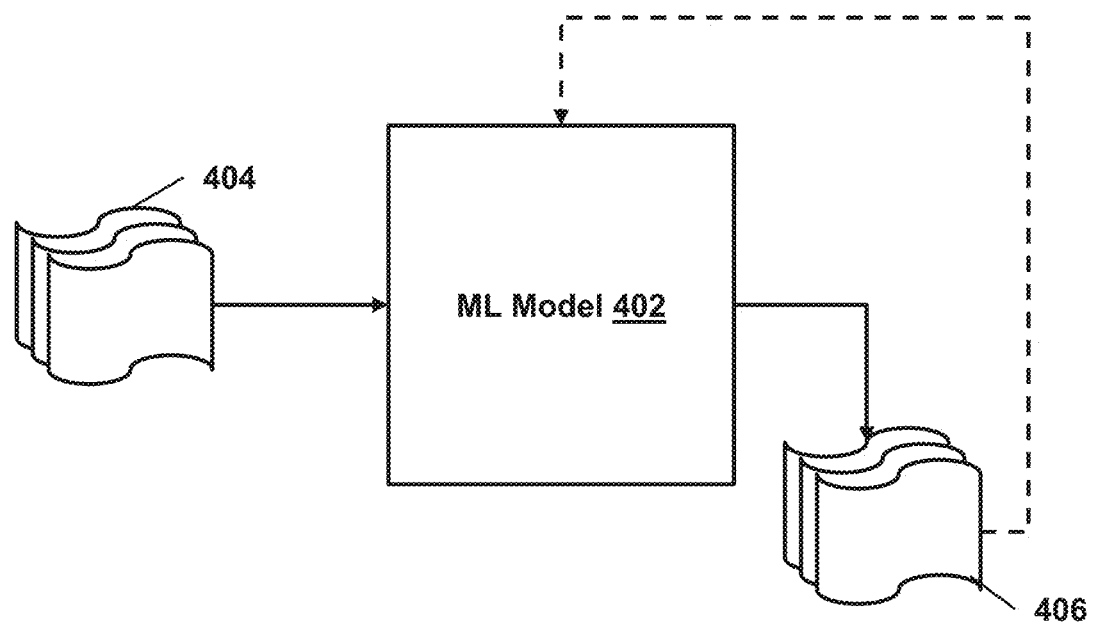
FIG. 4 is an illustrative diagram illustrating a machine learning model, in accordance with some implementations of the present technology.

FIG. 4 is an illustrative diagram illustrating a machine learning model, in accordance with some implementations of the present technology. In some implementations, machine learning model 402 can be part of, or work in conjunction with logical component 102 (FIG. 1). For example, logical component 102 can be a computer program that can use information obtained from machine learning model 402. In other implementations, machine learning model 402 may represent logical component 102, in accordance with some implementations of the present technology.

In some implementations, the machine learning model 402 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

As an example, with respect to FIG. 4, machine learning model 402 can take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 402 can be trained based on information stored in database 308 or database 312 to generate predictions related to mapping platform identifiers to one or more computing aspects. For example, database 308 may include information related to one or more platform identifiers, software application identifiers, security vulnerability information (e.g., security threats, tactics, techniques, and procedures (TTPs), or other security vulnerability information), security protection mechanisms (e.g., firewalls, encryption standards, hardware security module identifiers, communication protocols, system security policy information, or other security protection measure-related information), computing aspect identifiers (e.g., assessment-domain information, etc.) or other information. As an example, machine learning model 402 may be trained on one or more predetermined computing-aspect-mapping structures such that, when new information is provided to the machine learning model as inputs, machine learning model 402 may generate an updated or "new" computing-aspect-mapping structure that indicates a mapping of platforms to computing aspects involved with a processing of network operations. For instance, the computing-aspect-mapping structure can represent a data structure that maps platform identifiers (e.g., a cloud-based platform, a mobile application platform, third-party hosted platform, or other ecosystem of computing resources) to one or more computing-aspects (e.g., assessment domains). For example, the computing-aspect mapping structure may can be a table, graph, directed graph, array, or other data structure configured to include information related to platforms, security vulnerability descriptions, computing aspects, or other information. For instance, the computing-aspect-mapping structure may map platform identifiers to one or more computing aspects involved with a processing of network operations.

Computing-aspects may refer to any aspect of a computing system that is involved in a processing of data. For instance, a computing-aspect may be data storage, cryptography, platform usage, network, remote attestation, or other computing-aspect that is involved during the use of a software application being executed on a platform. Such computing-aspect-mapping structure can be generated to determine which computing aspects are involved with a given platform/software combination. As every software application is executed on a given platform, such as a cloud-based platform, each platform may be associated with a set of hardware and software that forms the "base layer" for a software application (e.g., as developed by one or more software developers) to be executed "on-top" of. Therefore, to accurately determine whether a software application is "safe" to use, it is important to determine which computing aspects are related to a particular platform and how the hardware/software combinations of that particular platform may impact the overall security of the software application being executed on the platform. As such, in some implementations, machine learning model 402 may be configured to generate a computing-aspect-mapping structure that may map one or more platform identifiers to one or more computing-aspects involved with a processing of data (e.g., execution of a software application) to determine a computing-aspect impact level (or assessment-domain impact level) for each computing-aspect associated with the platform.

For example, machine learning model 402 can take a first set of information as input 404. The first set of information can include platform identifiers, security vulnerability descriptions, one or more computing aspects, or other information. For example, the platform identifiers may indicate a respective platform that a software application is associated with (e.g., cloud-based application, mobile application, operating system), an identifier identifying an ecosystem of computing resources associated with the software application, or other platform identifier. The security vulnerability descriptions may indicate security vulnerability information, security threats, security attack vectors, TTPs, or other security vulnerability-related information. In some implementations, the security vulnerability descriptions may be obtained from one or more third-party security entities (e.g., a computing security related entity that provides computing threat related information, such as Mitre® or NIST®). Additionally, the one or more computing aspects may indicate predetermined categories that are related to one or more computing related aspects that are involved with a processing of network operations. As an example, the computing aspects may indicate assessment-domains, indicating a category of a process, procedure, or usage of computing function when data is processed by a computer. For instance, an assessment domain may indicate a "platform usage," "data storage," "network," "cryptography," "remote attestation," or other assessment domain. Such assessment domains may be a predetermined label to an aspect of computer functionalities related to processing network operations.

Machine learning model 402 can take the first set of information as input 404 and generate a computing-aspect-mapping structure as output 406. the computing-aspect-mapping structure may indicate a mapping of computing aspects mapped to one or more platform identifiers. For instance, prior to generating a computing-aspect impact level for each computing aspect associated with a given platform and the software application being executed on the platform, it is advantageous to determine which computing aspects are involved with the given platform. In this way, the system can later use the security vulnerability descriptions to determine how "big" or "how important" a given threat is to a specific computing aspect. Machine learning model 402 can use the security vulnerability descriptions and the platform identifiers to learn associations between the security vulnerability descriptions and the platform identifiers with respect to the predetermined computing aspects to correctly map a security vulnerability to a platform identifier. In some embodiments, output 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, a predetermined computing-aspect mapping, or other information).

In some implementations, machine learning model 402 can be trained based on information stored in database 308 or database 312 to generate predictions related determining threat values. As an example, a threat value may be any value indicating a level of a threat. For instance, a threat value may indicate a level of risk associated with a given security vulnerability, security vulnerability description, or other security vulnerability information. Machine learning model 402 can take a second set of information as input 404. The second set of information can include platform identifiers, security vulnerability descriptions, one or more computing aspects, a platform-specific policy, or other information. As an example, the platform-specific policy can indicate security impact information related to security-vulnerability descriptions. For instance, the platform-specific policy can indicate threat-aspects (e.g., threat information included in the security vulnerability descriptions) that are deemed significant to a given entity. The entity may be a service provider, company, corporation, merchant, or other entity. The entity may have a set of rules, procedures, or other guidelines/policies for handling security threats and/or security vulnerabilities that are important to the operation of one or more computing systems related to the entity as well as one or more computing aspects that are important to the one or more computing systems. As such, the platform-specific policy may act as a governing document for a particular computing platform of the entity that is associated with the handling of one or more threats, threat values, or threat mitigation values. In some implementations, the platform-specific policy may include one or more values that are assigned to security vulnerabilities and the respective computing aspects that are associated with the one or more values. As such, machine learning model 402 may use the platform-specific policy to determine or otherwise generate a threat value indicating a "threat level" (e.g., an impact of a security-vulnerability) that is specific to the entity, the associated computing platform of the entity, and the computing aspects associated with the computing platform of the entity. As an example, the entity may include various computing platforms to provide one or more services to an end-user. The entity may "care" more about a particular security vulnerability related to cryptography in a cloud-based platform/environment as opposed to the same vulnerability in a mobile application-based platform/environment. As such, the policy may indicate to give a "higher weight" to the threat value of the security vulnerability related to cryptography in the cloud-based platform/environment and give a lover weight to the same vulnerability in the mobile application-based platform/environment. In some implementations, the threat value may be a quantitative value, such as an integer, percentage, ratio, decimal value, or other quantitative value. In some implementations, the threat value may be a qualitative value, such as "high," "medium," "low," "yes," "no," or other qualitative value.

Machine learning model 402 can take the second set of information as input 404 and generate a threat value of each security vulnerability description as output 406. For instance, the machine learning model 402 can use the platform-specific policy to determine a threat value for each security vulnerability description with respect to each computing aspect of the entity's computing system by learning associations between a platform identifier, the information included in security vulnerability descriptions, the information included in the platform-specific policy, and the one or more computing aspects. In this way, the system may later use the threat values of each security vulnerability descriptions to determine how "big" or "how important" a given threat is to a specific computing aspect that is specific to the computing platform/environment of the entity. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined threat values, or other information).

In some implementations, machine learning model 402 can be trained based on information stored in database 308 or database 312 to generate predictions related determining computing aspect impact levels (e.g., assessment-domain impact levels). For example, machine learning model 402 can take a third set of information as input 404. The third set of information can include platform identifiers, security vulnerability descriptions, one or more computing aspects, a platform-specific policy, one or more impact level measures, or other information. As an example, the one or more impact level measures may indicate how to "measure" or otherwise "generate" a computing aspect impact level. For instance, the impact level measures may indicate one or more algorithms, weights, ratios, values, or mathematical formulas to serve as a basis for generating a normalized impact level. In some implementations, a computing aspect level may be a quantitative value, such as an integer, percentage, ratio, decimal value, or other quantitative value. In some implementations, the computing aspect level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the third set of information as input 404 and generate a computing aspect impact level for each computing aspect of a set of computing aspect as output 406. For instance, the machine learning model 402 can use the impact level measures by learning associations between a platform identifier, the information included in security vulnerability descriptions, the information included in the platform-specific policy, the one or more computing aspects, and the impact level measures. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related determining mitigated-computing-aspect impact levels (e.g., mitigated-assessment-domain impact levels). For example, machine learning model 402 can take a fourth set of information as input 404. The fourth set of information can include platform identifiers, security vulnerability descriptions, one or more computing aspects, a platform-specific policy, one or more impact level measures, system protection measure information, mitigated threat values, or other information. As an example, the one or more system protection measure information can indicate information related to a protection system associated with a given platform and software being executed on the platform with respect to an entity. For instance, an entity may employ one or more computing system protection measures to mitigate one or more computing-related threats, attacks, or other computing/network related threats. Such protection measures can include, but are not limited to firewalls, cryptographic communication standards, hardware security modules, honeypots, intrusion detection systems, scareware, proxy servers, software updates, hardware updates, or other cybersecurity related software/hardware protection measures. In some implementations, the system protection measures can be specific to a given platform (e.g., via a platform identifier). For instance, in a cloud-based platform/environment, the entity may employ one or more proxy servers whereas in a mobile-application based platform/environment, a hardware security module may be employed. It should be noted that any combination may exist, and such examples are merely exemplary. In some implementations, each system protection measure may be assigned a predetermined mitigated-threat-value. For example, each system protection measure may be assigned an "offset" value configured to "offset" a threat level of a security vulnerability. For instance, where a known security vulnerability of a cryptographic communication attack vector is known in a cloud-based environment, where an entity is employing a firewall, the threat value associated with the cryptographic communication attack vector may be mitigated. As such, the system may assign the threat value to the mitigated threat value to "lower" the impact level/threat level as the security vulnerability has been mitigated by the firewall. That is, the mitigated threat value level may be lower than that of the threat level currently assigned to the security vulnerability (e.g., as the entity is employing a firewall that has an effect on the attack vector). In some embodiments, the mitigated threat value and the mitigated-computing-aspect-impact level may be quantitative values, such as an integer, percentage, ratio, decimal value, or other quantitative value. In some implementations, the mitigated threat value and the mitigated-computing-aspect-impact level may be a qualitative values, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the fourth set of information as input 404 and generate a mitigated threat value and/or mitigated-computing-aspect impact level for each computing aspect of a set of computing aspect, with respect to a security vulnerability as output 406. For instance, the machine learning model 402 may use the system protection measures by learning associations between a platform identifier, the information included in security vulnerability descriptions, the information included in the platform-specific policy, the one or more computing aspects, and the impact level measures, the system protection measures, or other information. In this way, the system may later use the mitigated threat values and the mitigated-computing-aspect impact levels to generate an easily understood graphical representation of mitigated-computing-aspect-impact levels. By doing so, end-users, as well as software developers, may easily view a software security label to understand whether an entity is mitigating any known security vulnerabilities, thereby improving the user experience and increasing user trust. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigated-computing-aspect-impact levels, predetermined mitigated threat values, or other information).

In some implementations, machine learning model 402 can be a blackboard machine learning model. A blackboard machine learning model can represent a blackboard architectural model where a common knowledge base (e.g., the "blackboard") is updated by differing data sources (e.g., agents 104 (FIG. 1)). For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, etc.) to update the blackboard machine learning model with one or more partial solutions. In some implementations, the data sources may "publish" information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem. In some implementations, where machine learning model 402 is a blackboard machine learning model, machine learning model 402 may take a fifth set of information as input 404 and generate a computing aspect impact level for each computing aspect of a set of computing aspect as output 406.

As an example, the fifth set of information may include platform identifiers, security vulnerability descriptions, one or more computing aspects, a platform-specific policy, one or more impact level measures, or other information obtained from agents 104 (FIG. 1). For instance, the machine learning model 402 may use the input information (e.g., input 404) to learn associations between the input information (e.g., thereby generating partial solutions), and may also iteratively update the blackboard model based on new input information to generate outputs 406 indicating computing aspect impact levels for each computing aspect of a set of computing aspects associated with the platform. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related to generating a set of impacted computing-aspects (e.g., impacted assessment-domains). For example, machine learning model 402 can take a sixth set of information as input 404. The sixth set of information can include platform identifiers, security vulnerability descriptions, one or more computing aspects, one or more impact level measures, set of labeled feature vectors, computing system component identifiers, impacted-computing aspects, or other information. For example, the set of labeled feature vectors may indicate labels of (i) a given security vulnerability, (ii) a given computing system component, and/or (iii) a given impacted computing-aspect. Each feature vector of the set of labeled feature vectors may include a labeled security vulnerability, a labeled computing system component (e.g., identifying information of hardware or software associated with the computing system component), and labeled impacted computing-aspect such that each of the labels correspond to (or are otherwise associated with) one another. The feature vectors may be based on historically derived information indicating which security vulnerabilities affected a given computing system component, and which computing aspect (e.g., of a computing system/platform) was impacted by such. Leveraging this unique and robust training data, machine learning model 402 may be trained to generate accurate predictions determining a set of impacted computing-aspects.

Machine learning model 402 can take the sixth set of information as input 404 and generate a set of impacted computing-aspects as output 406. For instance, the machine learning model 402 may use the sixth set of information to learn associations between security vulnerabilities, computing system components, and impacted computing-aspects to generate a set of impacted computing-aspects when provided a set of security vulnerabilities. In this way, the system may later use generated set of impacted computing-aspects to generate an easily understood graphical representation of impacted computing-aspects, enabling users to quickly identify which aspects of a given computing-system is at risk of a security exploit. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined impacted-computing aspects, or other information).

In some implementations, machine learning model 402 can be trained based on information stored in database 308 or database 312 to generate predictions related generating a set of security mitigation actions. For example, machine learning model 402 can take a seventh set of information as input 404. The seventh set of information can include platform identifiers, security vulnerability descriptions, one or more computing aspects, a platform-specific policy, one or more impact level measures, system protection measure information, mitigated threat values, a second set of labeled feature vectors, or other information. For example, the second set of labeled feature vectors may indicate labels of (i) a given impacted computing-aspect, (ii) a given security vulnerability, and (iii) a given security mitigation action. Each feature vector of the set of labeled feature vectors may include a labeled impacted computing-aspect, a labeled security vulnerability (e.g., security vulnerability descriptions, security vulnerability responses, etc.), and labeled security mitigation action such that each of the labels correspond (or are otherwise associated with) one another. The feature vectors may be based on historically derived information indicating which security vulnerabilities affected a given computing-aspect, and which mitigation actions resolved the computing-aspect's security vulnerability.

The mitigation action may be an action that resolves or inhibits a security exploit related to the security vulnerability. In some implementations, mitigation action(s) may be based on a platform-specific policy that is described later. For example, mitigation action(s) for a platform usage computing-aspect may be "Ensure application detects Root or Jailbreak device and informs/restricts on app launch; Ensure only latest software version supported for app so as to leverage the native benefits and its security updates; ensure on latest software versions supported to align with OS security patches," or other information such as "install software version X.XX." Mitigation action(s) for a data storage computing-aspect may be "Do not store any sensitive data in clear on local device especially under external storage; Ensure application detects Root or Jailbreak device and informs/restricts on app launch; If sensitive data needs to be stored on client, then ensure encrypted storage is implemented; Avoid writing data on external storage due to global accessibility; Use clearCache to delete any sensitive data stored through webview; Explicitly mark allowBackup, debuggable as false," or other mitigation actions. Mitigation action(s) for a cryptography computing-aspect may be "Ensure application uses only entity approved encryption/signing/hashing methods; Only standard and approved protocols should be used to exchange symmetric keys between client app and server for secure communication; Ensure signature generation on client should leverage SE/TEE only; Ensure app does not rely on symmetric cryptography with hardcoded keys as sole method of encryption; Ensure app does not re-use the same cryptographic key for multiple purposes; All random values generated using a secure random number generator," or other mitigation actions. Mitigation actions for a computing-aspect of network communication may be "enforce HTTPS (TLS) for connections for any domain; Enforce application encryption on top of TLS; App checks invalid certificate and should not be allowed to continue despite a certificate error; Implement whitelisting of domains at app and validation at server; Ensure only entity recommended ciphers are configured; Implement certificate pinning and validation at network change; Implement Certification revocation list checks within app," or other mitigation actions. Mitigation action(s) for a computing-aspect of client code integration may be "ensure no application or third-party library or code are downloaded into application at run time; all dependent SDKs, Frameworks, Libraries should be embedded into application before packaging," or other mitigation actions. It should be noted, that not all computing-aspects (e.g., assessment-domains) and mitigation actions for determined security vulnerabilities are disclosed; others exists and those listed above are illustrative.

Machine learning model 402 can take the seventh set of information as input 404 and generate a set of mitigation actions as output 406. For instance, the machine learning model 402 may use the seventh set of information to learn associations between security vulnerabilities, computing system components, impacted computing-aspects, and mitigation actions to generate a set of mitigation actions when provided a set of impacted computing-aspects and a set of security vulnerabilities impacting the respective impacted computing-aspects. In this way, the system may later use generated set of mitigation actions to enable a user to quickly correct security vulnerabilities impacting a given computing system. Additionally or alternatively, the system may later use generated set of mitigation actions to configure a network component to automatically apply one or more mitigation actions to correct security vulnerabilities impacting the computing system/platform, thereby increasing networking and computing security. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigation actions, etc.).

Determining Security Vulnerabilities Via Network Operation Routes

Figure 5:
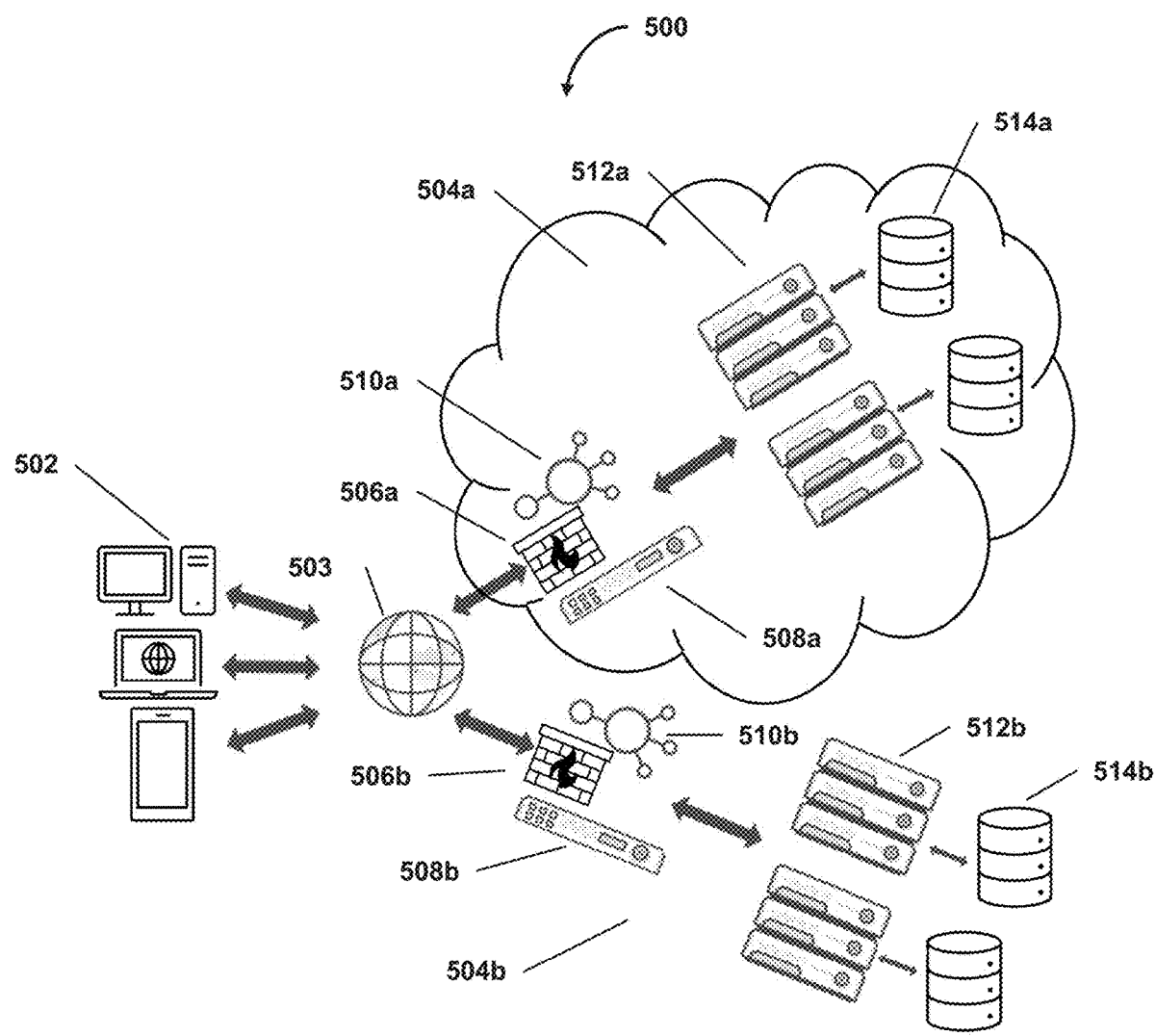
FIG. 5 shows an exemplary system for determining security vulnerabilities based on a network route for a network operation, in accordance with some implementations of the present technology.

FIG. 5 shows an exemplary system 500 for determining security vulnerabilities based on a network route for a network operation, in accordance with some implementations of the present technology.

To determine whether a software application is safe to use or is a secure application, in some implementations, it is advantageous to determine each platform that the software application is associated with. For instance, to determine platform-specific end-to-end security vulnerabilities based on a network route for a network operation, a mobile application (e.g., mobile application-based platform) may interact with a cloud-based platform as well as a third-party platform to process data related to a specific request, such as executing a computer program instruction. As referred to herein, a network operation can indicate a transmission of data over one or more computing networks, computing components, or computing systems. In some implementations, a network operation can indicate a processing of data between one computing system to another computing system, such as from a mobile application to a cloud-based computing system platform. For instance, a network operation can be a request for information, a transmission of information, or other computing-related operations. As an example, with respect to FIG. 5, a user can interact with user device 502. To execute a request, such as logging into an entity's computing system to gain access to one or more resources (e.g., account details, account balance, user profile settings, etc.), the user device 502 may transmit a request over network 503 which may then be relayed amongst cloud-based platform 504a to gain access to the entity's computing system. For instance, cloud-based platform 504a may include a cloud-based firewall 506a, a cloud-based software load balancer 510a, a cloud-based hardware load balancer 508a executing the cloud-based software load balancer 510a, one or more cloud-based servers 512a and one or more cloud-based databases 514a. Each of cloud-based firewall 506a, cloud-based software load balancer 510a, cloud-based hardware load balancer 508a executing the cloud-based software load balancer 510a, cloud-based servers 512a and cloud-based databases 514a may be impacted (or otherwise associated) with one or more platform-specific security vulnerabilities. For example cloud-based platform 504a can be associated with security vulnerabilities that can impact one or more computing aspects associated with the cloud-based platform with respect to the software application (or with respect to another cloud-based platform, such as a comparative cloud-based computing system platform) and third-party based platform 504b can be associated with a different set of security vulnerabilities that may impact one or more computing aspects associated with the third-party based platform with respect to the software application. Furthermore, as the login request is relayed through each one of those components, which can indicate a network route for the network operation of logging in, each security vulnerability can be examined to determine whether a computing-aspect is or is not impacted by the security vulnerabilities related to the platform, the software, and the hardware combinations along the network route. In this way, by determining each "component" that a network operation may interact with during a processing of a network operation, the system can accurately determine the secureness (or alternatively) the safety of the mobile application and it associated platform interactions to prevent data breaches.

In some implementations, a network processing route can include one or more network processing sub-routes. A network processing sub-route can be an interaction with one or more computing systems, computing software, or computing hardware components that enable the execution (or processing) of a network operation. A set of network processing sub-routes can comprise an overall network processing route. For example, where a network operation is a request to store an image from a third-party based platform 504b to the cloud-based platform 504a, the user device 502 may transmit a request over network 503 to (i) obtain an image from third-party database 514*b* and (ii) store the image in cloud-based database 514*a*. However, to execute such a request, the network processing route may then include a data flow from the user device 502 to network 503, then from network 503 to third-party firewall 506*b*, to third-party software load balancer 510*b*, to third-party hardware load balancer 508*b*, to third-party server 512*b*, to third-party database 514*b* to obtain the image. The obtained image can then be transferred back through each of third-party server 512*b*, to third-party hardware load balancer 508*b*, to third-party software load balancer 510*b*, third-party firewall 506*b*, and network 503. Lastly, to store the image on cloud-based database 514*a*, the obtained image may then be transmitted through each of cloud-based firewall 506*a*, cloud-based software load balancer 510*a*, cloud-based hardware load balancer 508*a* executing the cloud-based software load balancer 510*a*, cloud-based servers 512*a*, and cloud-based databases 514*a* to store the image. As such, although the mobile-application being executed on the user device is separate from cloud-based system and the third-party system, the mobile-application may interact with each, and therefore, security vulnerabilities for each component must be analyzed to generate an accurate end-to-end software security label.

In some implementations, upon determining a network processing route for a network operation, the system can determine each hardware component, software component, and platform that is associated with a given network operation. Using such information, the system may provide the hardware component, software component, and platform information to one or more machine learning models to determine computing-aspect impact levels and generate an end-to-end software security label for a software application.

Figure 6:
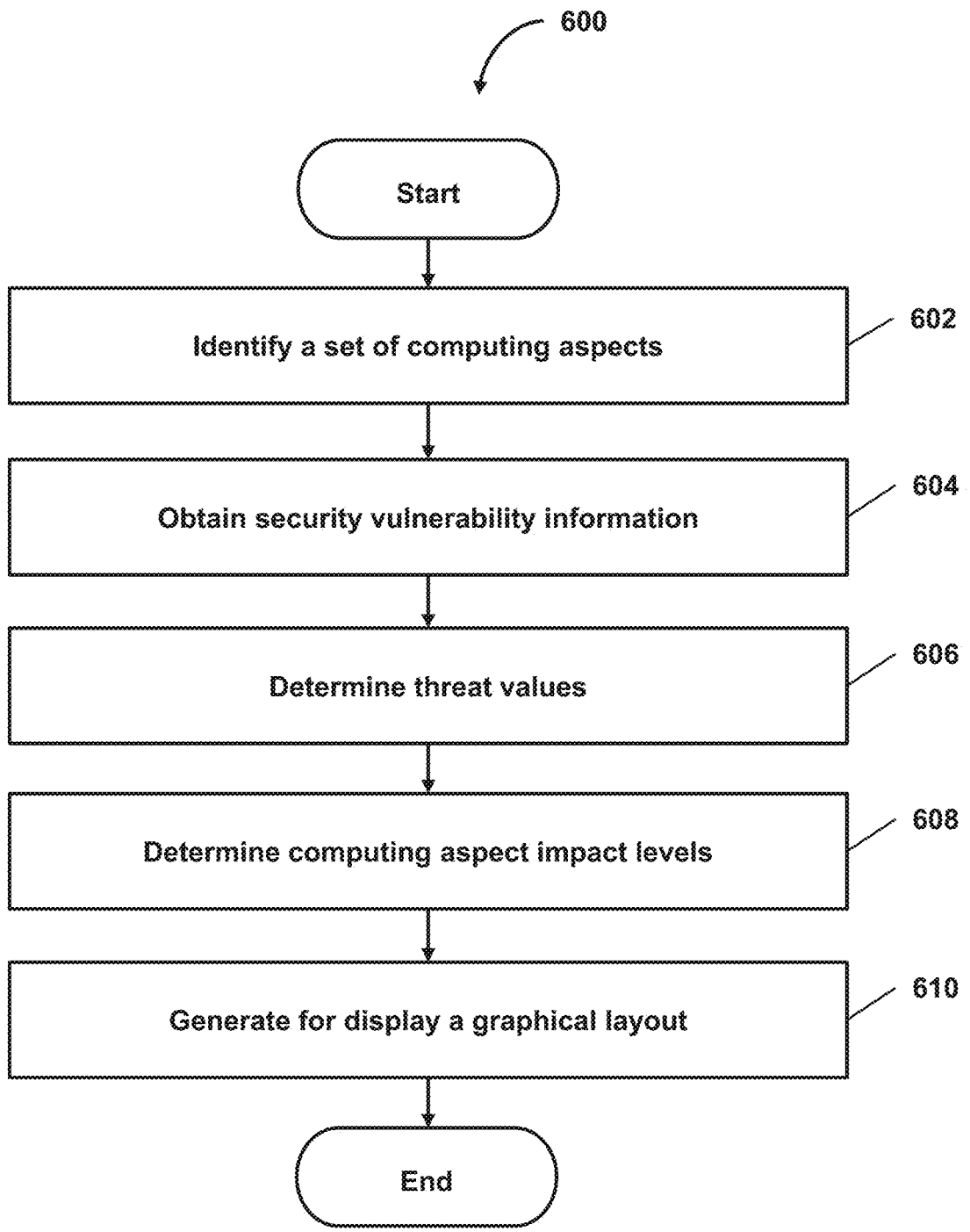
FIG. 6 is a flow diagram illustrating a process of determining platform-specific end-to-end security vulnerabilities for a software application via a Graphical User Interface (GUI), in accordance with some implementations of the present technology.

Determining Platform-Specific End-to-End Security Vulnerabilities for a Software Application FIG. 6 is a flow diagram illustrating a process of determining software platform-specific end-to-end security vulnerabilities, in accordance with some implementations of the present technology.

At act 602, process 600 can identify a set of computing aspects. For example, process 600 can identify a set of computing aspects associated with a software platform. To identify such computing aspects, process 600 can use a computing-aspect-mapping structure. The computing-aspect-mapping structure can indicate a mapping of platforms to computing aspects involved with a processing of network operations. A platform can be an ecosystem of computing resources within which a software application executes. For instance, a platform may be a cloud-based platform (e.g., Amazon Web Services®, Microsoft Azure®, Google Cloud®, or other cloud-based platforms), a mobile operating system platform (e.g., iPhone Operating System®, Android®, iPad Operating System®, Watch Operating System®, Windows Mobile Operating System®, Blackberry Operating System®, or other mobile operating system platforms), or other third-party hosted cloud or non-cloud-based platforms. Each platform can be associated with an identifier (e.g., an alphanumeric string, a numeric identifier, such as an integer, one or more values, or other identifier that uniquely identifies the respective platform). Additionally, the computing-aspect-mapping structure can map each platform (e.g., platform identifier) to one or more computing aspects involved with a processing of network operations. For instance, the computing aspects can represent assessment-domains which may indicate one or more categories of computing processes involved with processing of a network operation. As an example, an assessment domain can represent a computing aspect of "Platform Usage" (e.g., indicating the overall security of the platform), a computing aspect of "Data Storage" (e.g., indicating the overall security of data storage related computing components), a computing aspect of "Network" (e.g., indicating the overall security of network communications), or a computing aspect of "Cryptography" (e.g., indicating the overall security of cryptographic processes or cryptographic communications). Therefore, such assessment-domains may indicate overall categories to be assessed with respect to a platform, such that the assessment-domains are (i) specific to the platform (e.g., as differing platforms may be associated with different assessment-domains and/or computing aspects) and (ii) represent an overall assessment of each computing hardware component and software component involved with the platform(s) to which the software application is associated with.

As each platform can be associated with one or more hardware components and software components (e.g., software applications) being executed on each hardware component, the assessment-domains may indicate categories to be assessed when determining the overall security of a software application being executed on a given platform. As another example, where the platform is a comparative cloud-based platform, the comparative cloud-based platform may represent a cloud-based computing system platform that is standard to an entity or other system. For instance, the comparative cloud-based platform may be a cloud-based computing system platform that is associated with computing-aspects (e.g., assessment domains) that provide a baseline, standard, or other metric to compare other cloud-based computing system platforms to. For instance, such comparative cloud-based platforms may represent ideal cloud-based computing system platforms to which an entity (e.g., company, corporation, network engineer, user) deems acceptable in regard to computing-aspects associated with the comparative cloud-based computing system platform. As such, the comparative cloud-based computing system platform may be a model, secure, cloud-based computing system platform in which other cloud-based computing system platforms are compared to ensure that the other cloud-based computing system platforms are safe to use and are secure. It should be noted, that in some implementations, "assessment-domains" can be used interchangeably with "computing aspects," unless the context clearly indicates otherwise.

For example, when a user is interacting with a mobile application on a user device, the mobile application can be connected (e.g., via a network, such as the Internet) to one or more back-end servers to execute a request (e.g., a network operation). However, to execute a request, there may exist a multitude of computing components that the request must "pass through" to accomplish execution of the request. Such computing components may include, but are not limited to, firewalls, load balancers, servers, databases, or other computer-networking architecture components. Each of the computing components may be associated with their own respective security vulnerabilities. For instance, a server may be prone to a data breach if there is a known "back door" security vulnerability associated with the server, whereas a firewall may be prone to a man-in-the-middle attack. As such, each computing component may be evaluated independently, or in combination with one another to determine how secure the mobile application is.

Existing systems currently evaluate each computing component based on hardware identifying information, such as serial numbers, and evaluate any software being executed on the hardware via software versioning identifiers, while providing such information to a third-party to obtain relevant security threats. However, these threats are often complex and may or may not impact the overall operation of a given software application being executed on a platform (or the type of data that the software application handles). Moreover, such threats may not be specific to a platform as such threat information is often extremely generic. For example, the threats may be based on (i) the software application, (ii) information that the software application handles, and (iii) the platform to which the software application is hosted on (or otherwise associated with). For instance, a given software application may handle both sensitive and non-sensitive data. However, due to the generic nature of the information obtained from the third-party regarding the security threats related to the software application, the third-party may only provide threat information that is related to the non-sensitive data handling aspect of the software application which may lead to a data breach of sensitive user information. Additionally, the third-party may only provide threat information irrespective of the platform, where there may exist one or more security vulnerabilities that are directly related to the platform. To overcome this, the computing-aspect-mapping structure can include predefined computing aspects (e.g., assessment domains, such as cryptography, data storage, platform usage, networking, or other computing aspects) that are specific to a given platform, thereby enabling an end-user to easily identify whether a software application is secure or otherwise safe to use without the complex jargon of cybersecurity threat information.

In some implementations, process 600 can determine a platform associated with a software application. For example, process 600 can retrieve information related to the software application, such as a version identifier of the software application, operating system requirements of the software application, component identifier (e.g., hosting the software application), component serial number (e.g., hosting the software application), or other information associated with the software application. For instance, by using a component identifier, process 600 may determine from a database a platform associated with the software application. Using such information, process 600 can determine the platform that is associated with the software application.

In one use case, where the user is interacting with a software application on a user device, process 600 can retrieve a software version identifier and an operating system identifier of the user device. Process 600 may then compare the software version identifier and the operating system identifier of the user device to table indicating one or more platforms that are associated with the software application. For instance, as a given software application may be specific to a given platform (e.g., can only be executed on a particular platform, can be executed on a multitude of platforms, etc.), process 600 can retrieve a platform identifier from the table to determine the platform that is associated with the software application. In other implementations, process 600 can perform a search engine-query to determine a platform associated with the software application (e.g., using the software version identifier and the operating system identifier of the user device). In some implementations, process 600 can determine the platform associated with the software application by using a predetermined list of platform identifiers that are associated with an entity. For example, the entity may be a service provider, company, corporation, merchant, or other entity that is associated with the software application (e.g., an entity that controls the software application, that developed the software application, or otherwise provides the software application). The entity that is associated with the software application may have the most accurate knowledge on which platform the software application is executed on or which platforms the software application interacts with, in which process 600 can determine the platform associated with the software application more accurately than other methods.

In some implementations, the computing-aspect-mapping structure can be generated by a machine learning model. For example, as discussed in relation to FIG. 4, a machine learning model can generate the computing-aspect-mapping structure by using (i) information related to the software platform (e.g., the platform in which the software application is being executed on, or is associated with), and (ii) third-party entity security vulnerability information. In this way, the system dynamically generates the most up to date computing-aspect-mapping structures where security vulnerability information changes. By doing so, the user experience is improved by ensuring that the user is made aware of the most prevalent security vulnerabilities associated with the software application the user is interacting with.

At act 604, process 600 can obtain security vulnerability information. For example, process 600 can obtain a set of security-vulnerability descriptions indicating security threats associated with the platform. For example, process 600 can obtain the set of security-vulnerability descriptions from a security entity. The security entity, as discussed above, can be a security entity providing information pertaining to observed security vulnerabilities associated with computing components, such as hardware and software. In some implementations, the security entity can be an in-house security entity. For example, an in-house security entity may be the same or similar entity to which is associated with the software application. For example, the in-house security entity may be the same entity that controls the software application, that developed the software application, or otherwise provides the software application. Such in-house security entity may host a database of security vulnerabilities associated with software applications and/or platforms they control, develop, or provide. In some implementations, the security entity can be a third-party security entity. For example, a third-party security entity can be an entity that may not control, develop, or provide the software application, but observe security vulnerabilities within a multitude of software applications, platforms, or other computing components. As an example, third-party security entities may be Mitre®, NIST®, Mobile Threat Catalog (MTC), or other industry standard or trusted security entities. Such security entities can provide security-vulnerability descriptions that each indicate one or more security threats, attack vectors, TTPs, security-vulnerability responses, or other security-vulnerability-related information pertaining to one or more computing components and/or computing aspects associated with the one or more computing components.

In some implementations, the set of security-vulnerability descriptions can each be associated with one or more computing aspects involved with a processing of network operations. For example, as each security-vulnerability description is associated with a platform, process 600 can use the computing-aspect-mapping structure to further associate (or otherwise generate associations between) each security-vulnerability description with a respective computing aspect based on the platform. For instance, using a platform identifier, process 600 can parse through the computing-aspect-mapping structure to determine a match between a platform identifier of a security vulnerability description and a platform identifier of the computing-aspect-mapping structure. In response to a match between the platform identifier of the security vulnerability description and the platform identifier of the computing-aspect-mapping structure, process 600 can determine a match between a computing aspect identifier of the security vulnerability description and the computing aspect identifier of the computing-aspect-mapping structure. In response to a match between the computing aspect identifier of the security vulnerability description and the computing aspect identifier of the computing-aspect-mapping structure, process 600 can associate (e.g., populate, add to, concatenate, link, generate, etc.) the security vulnerability description to the computing-aspect-mapping structure with respect to the platform identifier and the computing aspect defined in the computing-aspect-mapping structure. In this way, process 600 can provide an enhanced computing-aspect-mapping structure that encompasses not only which computing aspects are involved with a platform, but also the relevant security vulnerabilities associated with the computing aspects of the platform.

In some implementations, the computing-aspect-mapping structure can be a predetermined computing-aspect-mapping structure including information related to (i) the platform, (ii) security vulnerabilities associated with the platform, and (iii) computing aspects associated with the respective platform and security vulnerabilities. For example, the predetermined computing-aspect-mapping structure can be a predetermined data structure created by one or more software developers. In this way, the system reduces the amount of computing processing resources and computer memory required to generate a dynamic computing-aspect-mapping structure. In other implementations, as discussed in relation to FIG. 4, the computing-aspect-mapping structure can be a machine learning model generated computing-aspect-mapping structure. In this way, the system provides an enhanced computing-aspect-mapping structure that is up to date with the most current security vulnerabilities, thereby improving the user experience.

At act 606, process 600 can determine threat values. For example, process 600 can determine a threat value of each security-vulnerability description of the set of security-vulnerability descriptions. In some implementations, process 600 can determine a threat value of each security-vulnerability description of the set of security vulnerability descriptions by using a platform-specific policy. For example, the platform-specific policy can indicate information related to the platform and the handling of threats associated with the given platform. The platform-specific policy can be a governing document created, managed, or controlled by the entity providing the software application (e.g., to which determining the security of the software application is based on). For example, the platform-specific policy may act as a governing document for a particular computing platform of the entity that is associated with the handling of one or more threats, threat values, residual risk values, or threat mitigation values. The platform-specific policy can include information such as predetermined threat values for a given security vulnerability description with respect to a platform, a given security vulnerability response with respect to a platform, a given TTP with respect to a platform, one or more computing aspects associated with the platform, or other values associated with security vulnerability-related information. For example, the platform-specific policy can include a mapping of security-vulnerability responses mapped to a respective threat level. Such threat levels (e.g., of the platform-specific policy) may indicate a quantitative or qualitative value indicating how "big" of a threat a given security vulnerability is. For instance, with respect to a cloud-based platform, a security vulnerability associated with a man-in-the-middle attack between a computing network and a server of the cloud-based platform may be mapped to a threat value of 10 (e.g., on a scale of 0-10, with 0 being the lowest threat level, and 10 being the highest threat level).

In some implementations, process 600 can determine threat values for each security-vulnerability description of the set of security-vulnerability descriptions by using a machine learning model. For example, as described in relation to FIG. 4, in some implementations, process 600 can provide platform identifiers (e.g., the platform that a software application is being executed on, or associated with), the set of security vulnerability descriptions, the one or more computing aspects associated with each of the security vulnerability descriptions, the platform-specific policy, or other information as input to the machine learning model. The machine learning model can output a set of threat values, where each threat value of the set of threat values are associated with a respective security-vulnerability description. As the machine learning model can generate predictions of the threat values with respect to the security vulnerabilities, process 600 provides an enhanced method for determining such threat values in scenarios where the platform-specific policy may not provide direct guidance of what a threat value is for a security-vulnerability description. In this way, process 600 can generate threat values for security-vulnerability descriptions that may not be defined in the platform-specific policy, thereby improving the user experience as unknown security-vulnerabilities that may be present (e.g., due to an update of security-vulnerability descriptions) may be associated with a threat value.

At act 608, process 600 can determine computing aspect impact levels. For example, process 600 can determine a computing aspect impact level for each computing aspect of the set of computing aspects associated with the platform using the determined threat value for each security-vulnerability description. For instance, as discussed in act 606, upon determining a threat value for each security-vulnerability description, process 600 can use the threat values to determine a computing aspect impact level for each computing aspect of the set of computing aspects associated with the platform. The computing aspect impact level can represent an "overall," "combined," "normalized," or other threat level with respect to a given computing aspect that is associated with the software application hosted on a respective platform. For example, as discussed above, to determine how secure or safe a given software application is, the platform that hosts the software application and other platforms that interact with the software application can be analyzed to determine what security vulnerabilities exist. For an end-user, determining whether the software application is secure (or safe to use) may be difficult to the complex cybersecurity jargon associated with security vulnerability descriptions. Thus, to generate an easily understood software security label for a software application, process 600 can determine, for each computing aspect associated with the platform that the software application is hosted on or interacts with, a computing aspect impact level. As opposed to existing systems merely providing users with the security vulnerability descriptions themselves in an unorganized format, process 600 can generate computing aspect impact levels for each computing aspect of the set of computing aspects associated with the platforms and subsequently generate a graphical user interface displaying such information to enable users to quickly and easily identify how secure a software application is.

To accomplish this, process 600 can aggregate each threat level corresponding to a respective computing aspect of the set of computing aspects associated with the platform and generate a computing aspect impact level for each computing aspect of the set of computing aspects associated with the platform. In some implementations, process 600 can use an industry standard risk assessment and/or scoring standard to generate the computing aspect impact level. For example, process 600 can use a Common Vulnerability Scoring System (CVSS) to generate a qualitative measure of severity of the security vulnerability descriptions with respect to a given computing aspect. As another example, process 600 can use the CVSS to generate a quantitative measure of severity of the security vulnerability descriptions with respect to a given computing aspect. In some implementations, process 600 can, for each computing aspect of the set of computing aspects, compute an average of each threat value corresponding to a security vulnerability description to generate the respective computing aspect impact levels. In other implementations, process 600 can, for each computing aspect of the set of computing aspects, compute a weighted average or a weighted sum of each threat value corresponding to a security vulnerability description to generate the respective computing aspect impact levels. In some implementations, the weights (e.g., of the weighted sum or the weighted average) can be predetermined weights that are respective to a given computing aspect and/or security vulnerability description. Additionally, in some implementations, process 600 can generate the computing aspect impact levels by identifying, for a given computing aspect, the highest generated threat level corresponding to a security-vulnerability description and use the highest generated threat level as the computing aspect impact level. It should be noted that the computing aspect impact levels can represent a quantitative value or a qualitative value that can be normalized on a respective scale. In this way, by generating a computing aspect impact level for each computing aspect of the set of computing aspects associated with the platform, process 600 provides an easily understood metric to enable end-users to quickly identify whether a software application they are interacting with is secure or otherwise safe to use, thereby improving the user experience.

At act 610, process 600 can generate for display a graphical layout. For example, as discussed above, to provide a user, whether it be an end-user such as a customer or a software developer, an easily understood software security label for a given software application, process 600 can generate for display at a graphical user interface (GUI), a graphical layout indicating computing-aspect-specific impact levels. For example, the graphical layout may include information pertaining to the software application, including, but not limited to a graphical representation of each computing aspect impact level of each respective computing aspect of the set of computing aspects associated with the platform, a platform identifier, computing aspect identifiers, graphical representations of mitigated computing aspect impact levels of each respective computing aspect of the set of computing aspects, a key or legend, or other information.

Figure 7:
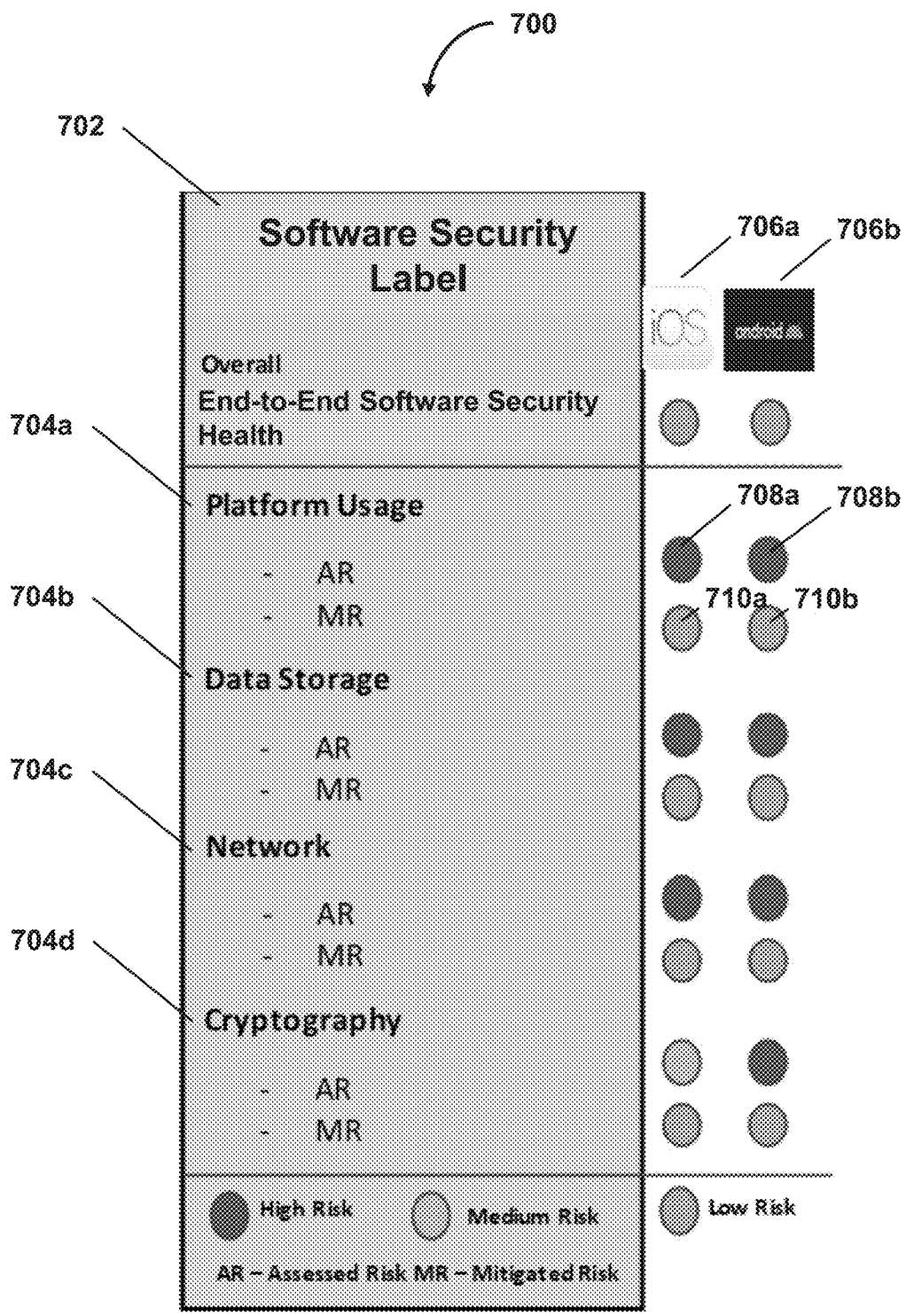
FIG. 7 shows an illustrative representation of a graphical layout for displaying platform-specific end-to-end security vulnerabilities for a software application via a GUI, in accordance with some implementations of the present technology.

Referring to FIG. 7, FIG. 7 shows an illustrative representation of a graphical layout for displaying platform-specific end-to-end security vulnerabilities for a software application via a GUI, in accordance with some implementations of the present technology. For example, software security label 700 can include a software security label identifier 702, computing aspect identifiers 704a-d, platform identifiers 706a-b, and computing aspect impact level representations 708a-b. The software security label identifier 702 can convey information to a user that the user is viewing a software security label. Computing aspect identifiers 704a-d may indicate the respective computing aspects that are associated with the platform that hosts the software application. For example, the computing aspect identifiers 704a-d may be the same or similar to the computing aspects as determined in act 602. Additionally, platform identifiers 706a-b may be the same or similar to the platforms as determined in act 602. Computing aspect impact level representations 708a-b may indicate a graphical representation of the determined computing aspect impact levels as determined in act 608. As shown, computing aspect impact level representations 708a-b may indicate a qualitative graphical representation of a respective computing aspect impact level as determined in act 608. For example, although FIG. 7 shows the computing aspect impact level representations 708a-b as color coded shapes, other graphical representations may be used in accordance with some implementations of the present technology, such as, but not limited to, numerical values (e.g., integers, decimals, percentages, ratios, etc.), alphanumeric strings (e.g., "high," "medium," "low," etc.), hexadecimal values, binary values, or other graphical representations of the computing aspect impact levels.

In some implementations, the graphical representations of the computing aspect impact levels can be predetermined. For example, with respect to a given computing aspect impact level, a graphical representation of the computing aspect impact level can correspond to a respective computing aspect impact level as determined in act 608. For instance, where the computing aspect impact levels are normalized on a scale of 0-100, 0-33 may correspond to a green shape indicating a "low" impact, 34-66 may correspond to a yellow shape indicating a "medium" impact, and 67-100 may correspond to a red shape indicating a "high" impact. In this way, by providing a graphical representation of each computing aspect impact level of the set of computing aspect impact levels, a user is enabled to quickly identify which "area" or computing aspect of a software application the user is, or may, interact with is affected (e.g., by a security vulnerability). As such, by being able to quickly identify which computing aspects of a software application may secure or unsecure (e.g., due to one or more security vulnerabilities), process 600 improves the user experience by aiding the user to make better decisions on whether or not to use a given software application, thereby decreasing the chance of any potential user data leak.

In some implementations, the software security label 700 can be interactive. For example, although a user-friendly, formatted, graphical user interface is provided to enable users to determine the security of a software application, some users may want to learn more about how a given computing aspect impact level is determined. For instance, a user may want to determine reasons why "platform usage" is a high-risk computing aspect. As such, in some implementations, the software security label 700 can be interactive enabling a user to select one or more graphical elements (e.g., software security label identifier 702, computing aspect identifiers 704a-d, platform identifiers 706a-b, and computing aspect impact level representations 708a-b, or other graphical elements) of the software security label 700. For example, computing aspect impact level representations 708a-b can be user-selectable. Upon a user selection of a computing aspect impact level representation 708*a-b*, an updated user interface may be presented to the user that may include additional information not shown in FIG. 7, such as, but not limited to, the computing aspect impact level (e.g., as a quantitative or qualitative value), one or more security vulnerabilities associated with the selected computing aspect impact level representation, one or more computing components or software components associated with the platform that is further associated with the computing aspect impact level (e.g., an indication of the software/hardware components causing the computing aspect impact level to be determined as is), security vulnerability details (e.g., type of vulnerability, attack vector of the vulnerability, date of discovery, system-provided comments related to the security vulnerability, assessment stage, etc.), inherent risks associated with the computing aspect impact level representation, residual risks associated with the computing aspect impact level representation, mitigation measures associated with the computing aspect, or other information that may be associated with the selected graphical element.

In some implementations, process 600 can update the graphical layout to include high-impact computing-aspect-specific impact levels. For example, to improve the user experience, process 600 can update the graphical layout to include a graphical representation of high-impact computing aspects of the set of computing aspect impact levels. That is, as opposed to generating a graphical representation of each computing aspect impact level, process 600 can update the graphical layout to include only the "highest" impacted computing aspects associated with the platform to aid the user in making a quick determination regarding the security of the software application. As such, process 600 can determine a set of high-impact computing aspects responsive to a respective computing aspect impact level exceeding a predetermined threshold value for the respective computing aspect. For example, each computing aspect can be associated with a predetermined threshold value to be indicated as a high-impact computing aspect. For instance, the computing aspect of "cryptography" may be associated with a predetermined threshold value of 7 (e.g., on a scale 0-10, with 0 indicating the lowest level of impact and 10 indicating the highest level of impact). Process 600 can compare each computing aspect impact level to the respective predetermined threshold value for the computing aspect. In response to the comparison indicating the computing aspect impact level meets or exceeds the predetermined threshold value for the respective computing aspect, process 600 can determine that the respective computing aspect is a high-impact computing aspect. Upon determining which computing aspects are high-impact computing aspects, process 600 can then update the graphical layout to only include a graphical representation of each high-impact computing aspects of the set of high-impact computing aspects and a graphical representation of the respective high-impact computing aspect impact level. The high-impact computing aspect impact level may be the same or similar to the computing aspect impact levels as determined in act 608, however, the updated graphical representation may only include the high-impact computing aspects to enable a user to quickly identify which computing aspects of a given software application are most impacted by one or more security vulnerabilities.

In some implementations, process 600 can determine a mitigated-computing-aspect impact level for each computing aspect of the set of computing aspects related to the platform. For instance, as an entity may employ one or more system protection measures (e.g., such as firewalls, software updates, hardware updates, cybersecurity hardware/software, etc.) to protect the entity's system or software application from cybersecurity threats, one or more security vulnerabilities as identified by a security entity may not impact the entity's system (e.g., due to the system protection measures). As such, to enable the user to see how a given entity is proactive in ensuring that their software application is indeed safe to use via their own system security measures or protocols, process 600 may determine mitigated-computing-aspect impact levels for each computing aspect of the set of computing aspects related to the platform.

Referring to FIG. 7, FIG. 7 shows a graphical representation of mitigated-computing-aspect impact levels 710*a-b* for a respective software application. For example, with respect to the computing aspect of platform usage 704*a*, for the platform 706*a* indicating iPhone Operating System®, FIG. 7 shows a graphical representation of computing aspect impact level 708*a* and a graphical representation of mitigated-computing-aspect-impact level 710*a*. In this example, the graphical representation of computing aspect impact level 708*a* is shown as a red shape indicating that there is a high impact of security vulnerabilities in relation to the platform usage. However, the graphical representation of mitigated-computing-aspect-impact level 710*a* is shown as a green shape indicating that there is a low impact of security vulnerabilities in relation to the platform usage. Due to the system protection measures in place by the entity with respect to the platform usage, the computing aspect impact level has changed or otherwise is "mitigated." In this way, the user is enabled to easily identify and be notified that the entity is employing techniques to ensure that their software application is secure and safe to use.

To determine the mitigated-computing-aspect impact levels for each computing aspect, process 600 can determine, for each security-vulnerability description, a system protection measure corresponding to a respective security-vulnerability description. For example, in some implementations, the entity providing the software application may store a data structure that is accessible to determine which system protection measures are in place to overcome one or more security vulnerabilities as identified by the security entity in act 604. For example, the data structure can be a table, graph, directed graph, array, or other data structure configured to include information related to platforms, the system protection measures associated with the platforms, mitigated-threat-offset-values, mitigated-threat values, security vulnerability descriptions, computing aspects, or other information. In some implementations, multiple data structures can exist where each data structure corresponds to a given platform. For instance, a first data structure can be related to a cloud-based platform, and may include mappings of a security vulnerability descriptions related to the platform to (i) one or more system protection measures of the platform and (ii) a mitigated threat value corresponding to the system protection measure. In this way, each mitigated threat value (e.g., predetermined mitigated threat values) is directly associated with a system protection measure affecting a respective security vulnerability of a specific platform. Each mitigated threat value may indicate a level of system protection with respect to a security-vulnerability. For instance, in some implementations, mitigated-threat offset value may act as an "offset" value, a weight, a percentage, or other value that may have an effect on a threat value of a security-vulnerability description. For instance, the data structure can indicate, that for a respective system protection measure corresponding to a security-vulnerability description of a given platform, a mitigated-threat-offset-value. In such an example, the mitigated-treat-offset-value may be 0.5, 0.4, 0.3, 0.2, 0.1. In this way, the mitigated-threat-offset-value may be multiplied to a threat value of the security vulnerability description (e.g., as obtained in act 606) to determine a mitigated threat value. In some implementations, upon determining a mitigated threat value for each computing aspect of the set of computing aspects related to the platform, the system can determine a mitigated-computing-aspect impact level for a given computing aspect by computing a weighted average of mitigated threat values with respect to the given computing aspect. In other implementations, process 600 can determine a mitigated-computing-aspect impact level for a given computing aspect by computing a weighted sum of mitigated threat value with respect to the given computing aspect.

In some implementations, process 600 can determine mitigated-computing-aspect impact levels for each computing aspect of the set of computing aspects related to the platform based on a machine learning model. For example, referring to FIG. 4, process 600 can provide platform identifiers, security vulnerability descriptions, one or more computing aspects, a platform-specific policy, one or more impact level measures, system protection measure information, mitigated threat values, or other information to a machine learning model to generate predictions related to mitigated-computing-aspect impact levels for each computing aspect of the set of computing aspects associated with the platform. In this way, process 600 can generate accurate mitigated-computing-aspect impact levels where one or more mitigated threat values or system protection measures are unknown, thereby improving the user experience.

In some implementations, process 600 can generate a graphical representation of the mitigated-computing-aspect impact levels to be displayed in a graphical user interface. For example, referring back to FIG. 7, as discussed above, process 600 can generate a graphical representation for each mitigated-computing-aspect impact level for each computing aspect of the set of computing aspects related to the platform. For example, process 600 can generate a graphical representation for each mitigated-computing-aspect impact level in a manner similar to that of act 610, whereas opposed to using the computing aspect impact levels as determined in act 608, process 600 can may the mitigated-computing-aspect impact levels as determined above.

Determining Comparative Real-Time End-To-End Security Vulnerabilities

Figure 8:
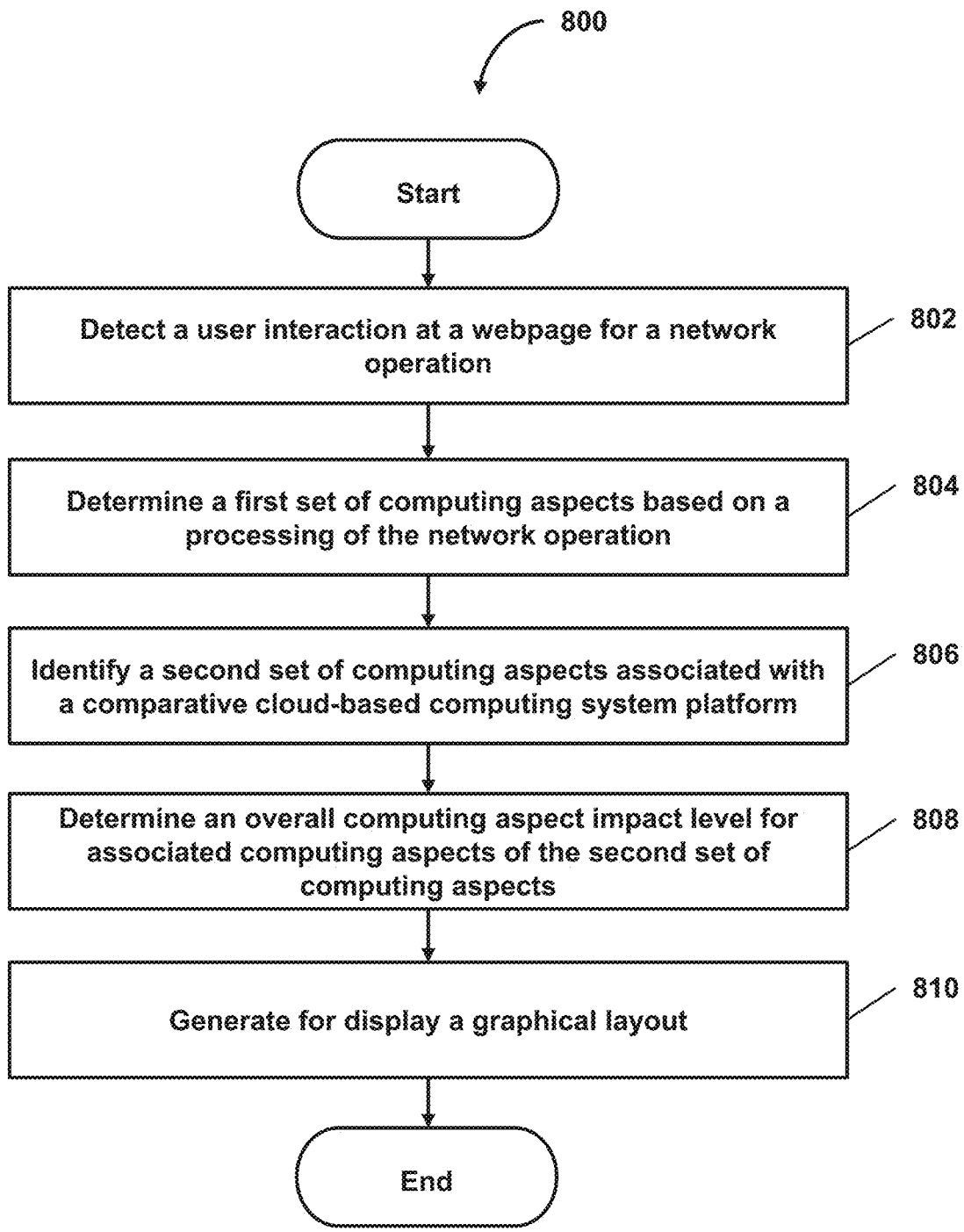
FIG. 8 is a flow diagram illustrating a process of determining comparative real-time end-to-end security vulnerabilities, in accordance with some implementations of the present technology.

FIG. 8 is a flow diagram illustrating a process of determining comparative real-time end-to-end security vulnerabilities, in accordance with some implementations of the present technology.

At act 802, process 800 can detect a user interaction at a webpage for a network operation. To provide users (e.g., network engineers, end-users, or other system users) with updated security-related information with respect to a cloud-based computing system platform (or other computing system platform), process 800 can detect a user interaction at a webpage for a network operation to determine computing-aspects (e.g., assessment domains) that a given cloud-based computing system platform possesses. For example, the network operation can be a processing of data from one computing system platform (e.g., a remote computing system, a mobile computing system, a fixed-terminal computing system, etc.) to a set of cloud-based computing system platforms. For instance, a user may use a mobile device executing a mobile application on a mobile application computing system platform to log into a user account associated with an entity (e.g., a company, service provider, etc.). To log the user into the entities system, one or more log-in processes may be processed on a cloud-based computing system platform. As another example, the network operation may be a test operation (e.g., a ping or other test-related operation). The test operation may include test information such as the time, date, a request for additional information related to the security of a given cloud-based computing system platform, a status request of current operations of the cloud-based computing system platform, or other information to determine a given operating status of the cloud-based computing system platform.

However, to determine in real-time (or near real-time) whether a given cloud-based computing system platform is secure and safe to use, process 800 can transmit (or process) the network operation (e.g., the log in request, test operation) to a set of cloud-based computing system platforms. For example, each cloud-based computing system platform, can be associated with a cloud-based platform service provider such as Microsoft Azure, Google Cloud, Amazon AWS, or other cloud-based platform service providers. The set of cloud-based computing system platforms may be a predetermined set of cloud-based computing system platforms (e.g., set by a system administrator, the entity, or other user) or may be a dynamic set of cloud-based computing system platforms. For example, where the set of cloud-based computing system platforms are a dynamic set of cloud-based computing system platforms, process 800 can web scrape for currently operating (e.g., currently available, currently functioning) cloud-based computing system platforms to determine the set of cloud-based computing system platforms to provide a robust comparison between cloud-based computing system platforms when one or more may be currently down, inoperable, or newly added. Thus, by detecting a user interaction at a webpage for a network operation, the system can determine a set of cloud-based computing system platforms to process, transfer, or transmit the network operation to.

In some implementations, the where the network operation is a test operation, the test information can include information that targets a variety of computing aspects (e.g., assessment-domain) or a single computing aspect. For example, computing aspects associated with computing system platforms (e.g., cloud-based computing system platforms, cloud-based service providers, etc.) may be Boundary Enforcement, Logical Segmentation, Configuration Hardening, Key Management, Encryption, Asset & Data Classification, Data Discovery, Logging & Reporting, User Behavior Analytics, Secondary Approval, Access Control, Authentication, or other computing aspects associated with cloud-based computing system platforms. To determine how secure a cloud-based computing system platform is (e.g., in real-time or near real-time), the test operation may include test information that queries, requests, pings, executes a script, or otherwise interacts with a cloud-based computing system platform to obtain security-related information from the cloud-based computing system platform.

For example, in the case where the test operation includes test information for the computing aspect (e.g., assessment-domain) of Access Control, the test information may include a request for "Security Rules" configuration information. As cloud-based computing system platforms can respond to the test operation, the cloud-based computing system platform may provide a configuration profile or other security-related information related to the test operation to enable the system to obtain valuable security-related information. Continuing with the example above, where the test information includes a request for the "Security Rules" configuration profile of the computing aspect of Access Control, process 800 can receive the response (e.g., the security rules configuration information) to determine whether any Internet or Unauthorized access is allowed for restricted resources by default (e.g., as set by the cloud-based computing system platform). In other implementations, the network operation may include a set of test operations to test other computing aspects that may or may not be associated with a given cloud-based computing system platform (or other computing system platform), in accordance with some implementations of the present technology. In this way, the system obtains real-time security-related information of cloud-based computing system platforms, thereby detecting newly discovered security-vulnerabilities that otherwise may not be detected for an extended period of time.

At act 804, process 800 can determine a first set of computing aspects based on a processing of the network operation. For example, process 800 can determine a first set of computing aspects (e.g., assessment-domains) associated with each cloud-based computing system platform of the set of cloud-based computing system platforms using response data received from each respective cloud-based computing system platform. The response data can be received, over one or more computing networks (e.g., network 304 (FIG. 3)) from each of the cloud-based computing system platforms of the set of cloud-based computing system platforms based on the processing of the network operation. The response data may be information transmitted by respective cloud-based computing system platforms when the network operation is processed (e.g., transmitted, transferred, etc.) via the cloud-based computing system platform. As an example, where the network operation is a test operation, the respective cloud-based computing system platforms may transmit a response and process 800 may receive the response. In some implementations, the response data may include a set of logging information indicating one or more computing aspects associated with the respective cloud-based computing system platform. For instance, process 800 may receive the response data from a first cloud-based computing system platform that includes information pertaining to an encryption method the first cloud-based computing system platform is using, a given network the first cloud-based computing system platform is using, software identifiers associated with software applications the first cloud-based computing system platform is using, a timestamp at which the network operation is processed at the first cloud-based computing system platform, a speed (e.g., throughput) of how fast the network operation is processed on the first cloud-based computing system platform, configuration profiles, configuration settings, or other response data.

In some implementations, the response data may represent security-specification data. For example, security-specification data may be information retrieved by each of the respective cloud-based computing system platforms via the respective cloud-based computing system platform service providers. For instance, Microsoft Azure, Google Cloud, Amazon AWS, or other cloud service providers may store security-specification data related to encryption methods, hashing methods, digital signature methods, public key infrastructure, identity and access management architecture, single sign-on methods, cloud-based security groups, hardened virtual server imaging techniques, computing-aspects associated with the respective cloud-based service providers, security vulnerability information, or other security-specification information that the respective cloud service providers currently employ. In some implementations, the response data may be obtained by process 800 performing web scraping for such security-specification data. However, to ensure the most up-to-date response data is obtained, based on the processing of the network operation, the response data may be returned in real-time or near real-time indicating security-vulnerability or other security-vulnerability related information.

For example, to determine a set of computing aspects associated with each of the respective cloud-based computing system platforms, process 800 can transmit the network operation to each of the cloud-based computing system platforms to obtain (e.g., receive) a response from each of the cloud-based computing system platforms indicating computing-aspect-related information (e.g., as described above). As another example, where no response is received (e.g., for a test operation), the lack of a response may indicate that, where the test operation is testing for a given computing aspect, that the cloud-based computing system platform the network operation was transmitted to does not include/employ/implement the given computing aspect. As such, process 800 may determine that the given computing aspect (e.g., assessment domain) is not associated with the computing system platform to which the network operation was sent to.

As referred to herein, real-time may indicate the actual time during which something takes place. Additionally, as referred to herein, near real-time may indicate the actual time during something takes place with a minor delay. For example, the minor delay may be 1 ms, 2 ms, 3 ms, etc. For instance, as computer processors can process data exceptionally fast, there still can be a small delay of time from input of an operation to the output of the operation (e.g., 1 ms, 2 ms, 3 ms, or other delay). As such small-time delays are unnoticeable to humans, the time between a computer processor receiving input data and providing output data may appear as though such processing of information happened immediately, or otherwise, in real-time. It is advantageous to transmit the network operation to each of the respective cloud-based computing system platforms to identify computing aspects that the cloud-based computing system platforms are currently employing in order to determine whether a given cloud-based computing system platform is secure or safe to use, thereby improving the user experience and reducing the chance of a data breach of user data.

At act 806, process 800 can identify a second set of computing aspects associated with a comparative cloud-based computing system platform. For example, process 800 can identify a second set of computing aspects associated with a comparative cloud-based computing system platform. The comparative cloud-based computing system platform may represent a standard, baseline, model, metric, or other cloud-based computing system platform that each cloud-based computing system platform (e.g., of the first set of cloud-based computing system platforms) may be compared against. For instance, network engineers may seek certain attributes, computing aspects, assessment-domains, or security protection measures with respect to cloud-based computing system platforms. As such, the comparative cloud-based computing system platform may be associated with a set of computing aspects (or assessment-domains) that are sought after by the network engineers. In some implementations, the second set of computing aspects associated with the comparative cloud-based computing system platform may be identified using the computing-aspect-mapping structure (e.g., as described in act 602 (FIG. 6)).

Using the computing-aspect-mapping structure, process 800 can quickly identify which assessment-domains are involved, or otherwise associated with the processing of the network operation or the comparative cloud-based computing system platform, thereby reducing the amount of computer processing and memory resources required to obtain the set of computing aspects associated with the comparative cloud-based computing system platform. For example, computing-aspect-mapping structure can identify, for a given platform (e.g., cloud-based, mobile, fixed terminal, etc.) computing-aspects that are associated with the given platform. In some implementations, the computing-aspect-mapping structure may indicate the baseline or standard set of computing aspects associated with the comparative cloud-based computing system platform based on an identifier identifying that the platform is a cloud-based computing system platform. In this way, the system may determine a set of comparative computing aspects associated with the comparative cloud-based computing system platform to determine how the first set of cloud-based computing system platforms perform with respect to sought after attributes of the comparative cloud-based computing system platform.

At act 808, process 800 can determine an overall-computing aspect impact level for associated computing aspects of the second set of computing aspects. For example, process 800 can determine an overall-computing aspect impact level for associated computing aspects of the second set of computing aspects using (i) the first set of computing aspects associated with each cloud-based computing system platform and (ii) the second set of computing aspects. In some implementations, the overall-computing aspect impact level for associated computing aspects may be a normalized computing aspect impact level for a respective cloud-based computing system platform. For instance, to compare each cloud-based computing system platform to which the network operation is processed, process 800 can compare the cloud-based computing aspects associated with each cloud-based computing system to the comparative set of computing aspects that are sought after by the network engineers. That is, the comparative set of computing aspects may act as guidelines for other cloud-based computing system platforms to be compared to.

However, not all cloud-based computing system platforms may employ the same set of computing aspects as the set of comparative set of computing aspects. For example, network engineers may want an ideal cloud-based computing system platform to use cryptographic communications, access control, and threat detection monitoring. Moreover, such computing aspects may each be associated with a given type, method, or functionality which may be associated with a given threat value (e.g., as described in act 606). For example, although a cloud-based computing system platform may use cryptographic communications with an Rivest-Shamir-Adleman (RSA) algorithm, the corresponding comparative computing-aspect of the comparative cloud-based computing system platform may use cryptographic communications with an Elliptic Curve Digital Signature Algorithm (ECDSA). The RSA algorithm may be associated with a higher threat value than the ECDSA algorithm as ECDSA is considered more complex and more secure. Additionally, the cloud-based computing system to be compared to the comparative cloud-based computing system may not include an access control computing aspect. As such, in some implementations, process 800 may determine a set of associated computing aspects to appropriately compare one cloud computing system platform to the comparative, or ideal, cloud computing system platform based on the aspects associated with each.

In some implementations, the associated computing aspects of the second set of computing aspects can be a matching set of computing aspects, a mismatched set of computing aspects, or both the matching set of computing aspects and the mismatched set of computing aspects. For example, the matching set of computing aspects may be a matching set of computing aspects (e.g., assessment-domains) between (i) the comparative cloud-based computing system platform and (ii) a respective cloud-based computing system platform of the set of cloud-based computing system platforms (e.g., to which the network operation is processed). For instance, a first cloud-based computing system platform may be associated with the computing aspects of (i) data encryption, (ii) access controls, and (iii) threat detection and monitoring. The comparative cloud-based computing system platform may be associated with the computing aspects of (i) data encryption, (ii) network security, and (iii) threat detection and monitoring. As such, process 800 may compare the computing aspects of the first cloud-based computing system platform to the comparative cloud-based computing system platform and determine the associated set of computing aspects to be (i) data encryption and (ii) threat detection and monitoring. In this way, the system may ensure a direct comparison of the computing aspects between the respective cloud-based computing system platforms' computing aspects and the comparative cloud-based computing system platforms' computing aspects, thereby enabling a network engineer to be provided with an "apples to apples" comparison of one cloud-based computing system platform to another cloud-based computing system platform.

As another example the associated computing aspects of the second set of computing aspects can be a mismatched set of computing aspects. For example, the mismatched set of computing aspects may be a mismatched set of computing aspects (e.g., assessment-domains) between (i) the comparative cloud-based computing system platform and (ii) a respective cloud-based computing system platform of the set of cloud-based computing system platforms (e.g., to which the network operation is processed). For instance, a first cloud-based computing system platform may be associated with the computing aspects of (i) data encryption, (ii) access controls, and (iii) threat detection and monitoring. The comparative cloud-based computing system platform may be associated with the computing aspects of (i) data encryption, (ii) access controls, (iii) threat detection and monitoring, and (iv) network security. As such, process 800 may compare the computing aspects of the first cloud-based computing system platform to the comparative cloud-based computing system platform and determine the associated set of computing aspects to be network security as the first cloud-based computing system platform may not employ a network security mechanism. In this way, the system may compare respective cloud computing platforms' aspects to the comparative cloud-based computing system platforms' computing aspects to easily identify security vulnerabilities amongst cloud-based computing system platforms.

As yet another example, the associated computing aspects of the second set of computing aspects can comprise both the matching set of computing aspects and the mismatched set of computing aspects. For example, to enable users (e.g., network engineers) to be provided with an overview display of how each cloud-based computing system platform compares to an ideal cloud-based computing system platform, process 800 may select both the matching set and the mismatched set of computing aspects as the associated computing aspects of the second set of computing aspects.

Upon determining the associated computing aspects (e.g., associated assessment-domains), process 800 can determine an overall-computing aspect impact level for each of the computing aspects of the respective cloud-based computing system platforms with respect to the comparative cloud-based computing system platform's computing aspects. As an example, the overall-computing aspect impact level may be determined in a manner the same or similar to that of the computing aspect impact levels of act 606 of FIG. 6. Additionally, or alternatively, the overall-computing aspect impact levels may be determined using security-vulnerability descriptions, security-vulnerability responses, placeholder computing aspect impact levels, placeholder assessment-domain impact levels, or a machine learning model (e.g., blackboard machine learning model, neural network, etc.).

In some implementations, where the associated set of computing aspects are the matching set of computing aspects, process 800 can obtain from a third-party security entity, a set of security-vulnerability descriptions. Each security-vulnerability description of the set of security-vulnerability descriptions may indicate at least one security threat associated with a respective computing aspect of the matching set of computing aspects. For instance, similar to obtaining security-vulnerability information in act 604 of process 600 (FIG. 6), for each computing aspect of the matching set of computing aspects, process 800 may obtain security-vulnerability descriptions indicating security threats associated with the respective cloud-based computing platforms (e.g., to which the network operation is processed). Process 800 can then assign a threat value to each security-vulnerability description of the set of security-vulnerability descriptions by comparing respective security-vulnerability descriptions to a platform-specific policy, where the platform-specific policy includes security-vulnerability descriptions mapped to a respective threat level.

For example, similar to assigning or determining threat values in act 606 of process 600 (FIG. 6), process 800 can determine threat values for each security-vulnerability description of the set of security-vulnerability descriptions by using predetermined threat values for a given security vulnerability description with respect to a platform (e.g., respective cloud-based computing system platform to which the network operation is processed), a given security vulnerability response with respect to a platform, a given TTP with respect to a platform, one or more computing aspects associated with the platform, or other values associated with security vulnerability-related information. Process 800 can then determine the overall-computing aspect impact level for each matching computing aspect of the set of matching computing aspects respective to the cloud-based computing system platform by computing a weighted average of assigned threat values of the respective matching computing aspects. For example, similar to determining computing aspect impact levels in act 608, of process 600 (FIG. 6), process 800 may determine overall-computing aspect impact levels for each matching computing aspect. For instance, to determine the overall-computing aspect impact level for each matching computing aspect of the set of matching computing aspects respective to a given cloud-based computing system platform (e.g., to which the network operation is processed), process 800 may compute a weighted average of the assigned (e.g., determined) threat values of the respective matching computing aspects. In some implementations, as each security-vulnerability description may be associated with multiple security-vulnerability responses each assigned a threat value, the security-vulnerability responses may be assigned a predetermined weight to compute a weighted average, or a weighted sum of the threat values associated with the security-vulnerability responses to determine an overall-computing-aspect impact level for a given computing aspect.

For instance, where a given cloud-based computing system platform to which the network operation is processed is associated with the matching computing aspects (e.g., of the comparative cloud-based computing system platform) of compliance certifications, encryption, and access controls, the encryption computing aspect may be associated with two security-vulnerability responses mapped to respective threat values. The two-security vulnerability-responses may be weighted by a predetermined weight (e.g., the first threat value is assigned a weight of 2, and the second treat value is assigned a weight of 1). Similarly, compliance certifications and access controls computing aspects may each be associated with one or more security-vulnerability responses mapped to respective threat values, where each threat value is weighted with respect to the corresponding computing aspect. In some implementations, the predetermined weights for each security vulnerability-responses may be determined based on the platform specific policy indicating which security-vulnerability responses should be weighted higher than another. It should be noted that other predetermined weight values may be assigned to computing aspects, in accordance with one or more implementations of the present technology. In some implementations, process 800 can compute a weighted sum of the assigned threat values of the respective matching computing aspects. In this way, by determining overall-computing aspect impact levels for the set of matching computing aspects, users may be provided with a direct comparison of the security of respective computing aspects of cloud-based computing system platforms perform, thereby improving the user experience as users are provided with an easily understood metric when determining which cloud-based computing system platform is safest to use. Moreover, in this way, network traffic is reduced as users forgo conducting tedious research by submitting multiple queries over one or more computing networks to determine whether a given cloud-based computing system platform is safe to use.

In some implementations, where the associated set of computing aspects are the mismatched set of computing aspects, process 800 can obtain from the third-party security entity, a set of security-vulnerability descriptions. Each security-vulnerability description of the set of security-vulnerability descriptions may indicate at least one security threat associated with a respective computing aspect of the mismatched set of computing aspects. For instance, similar to obtaining security-vulnerability information in act 604 of process 600 (FIG. 6), for each computing aspect of the mismatched set of computing aspects, process 800 may obtain security-vulnerability descriptions indicating security threats associated with the respective cloud-based computing platforms (e.g., to which the network operation is processed). Process 800 can then assign a threat value to each security-vulnerability description of the set of security-vulnerability descriptions by comparing respective security-vulnerability descriptions to a platform-specific policy, where the platform-specific policy includes security-vulnerability descriptions mapped to a respective threat level.

For example, similar to assigning or determining threat values in act 606 of process 600 (FIG. 6), process 800 can determine threat values for each security-vulnerability description of the set of security-vulnerability descriptions by using predetermined threat values for a given security vulnerability description with respect to a platform (e.g., respective cloud-based computing system platform to which the network operation is processed), a given security vulnerability response with respect to a platform, a given TTP with respect to a platform, one or more computing aspects associated with the platform, or other values associated with security vulnerability-related information. Process 800 can then determine the overall-computing aspect impact level for each mismatched computing aspect of the set of mismatched computing aspects respective to the cloud-based computing system platform by computing a weighted average of assigned threat values of the respective matching computing aspects. For example, similar to determining computing aspect impact levels in act 608, of process 600 (FIG. 6), process 800 may determine overall-computing aspect impact levels for each mismatched computing aspect. For instance, to determine the overall-computing aspect impact level for each mismatched computing aspect of the set of mismatched computing aspects respective to a given cloud-based computing system platform (e.g., to which the network operation is processed), process 800 may compute a weighted average of the assigned (e.g., determined) threat values of the respective mismatched computing aspects. In some implementations, as each security-vulnerability description may be associated with multiple security-vulnerability responses each assigned a threat value, the security-vulnerability responses may be assigned a predetermined weight to compute a weighted average or a weighted sum of the threat values associated with the security-vulnerability responses to determine an overall-computing-aspect impact level for a given computing aspect.

For instance, where a given cloud-based computing system platform to which the network operation is processed is associated with the mismatched computing aspects (e.g., of the comparative cloud-based computing system platform) of threat detection, the threat detection computing aspect may be associated with three security-vulnerability responses mapped to respective threat values. The three security-vulnerability responses may be weighted by a predetermined weight (e.g., the first threat value is assigned a weight of 2, the second treat value is assigned a weight of 1, and the third threat value is assigned a weight of 3). In some implementations, the predetermined weights for each security vulnerability-responses may be determined based on the platform specific policy indicating which security-vulnerability responses should be weighted higher than another. It should be noted that other predetermined weight values may be assigned to computing aspects, in accordance with one or more implementations of the present technology. In some implementations, process 800 can compute a weighted sum of the assigned threat values of the respective matching computing aspects. In this way, by determining overall-computing aspect impact levels for the set of mismatched computing aspects, users may be provided with a security-related information of respective mismatched computing aspects of cloud-based computing system platforms perform, thereby improving the user experience as users are provided with an easily understood metric when determining which cloud-based computing system platform is safest to use. Moreover, in this way, network traffic is reduced as users forgo conducting tedious research by submitting multiple queries over one or more computing networks to determine whether a given cloud-based computing system platform is safe to use.

In some implementations, where the associated set of computing aspects are the matching set and the mismatched set of computing aspects, upon determining the computing aspect impact level for each of the matching set of computing aspects, process 800 can assign placeholder computing aspect impact levels for each mismatched computing aspect of the set of mismatched computing aspects that are respective to a given cloud-based computing system platform. The placeholder computing aspect impact levels may be predetermined placeholder values (e.g., normalized quantitative values on a scale (e.g., 1-10, 1-100, 1-1000), placeholder computing aspect impact levels, or other quantitative value). For example, as one cloud-based computing system platform may not use or employ a given computing aspect as compared to the comparative set of computing aspects of the comparative cloud-based computing system, it may be advantageous to assign a placeholder value (e.g., a computing aspect impact level) to the mismatched (or missing) computing aspects. That is, to provide users with robust information as to whether a given cloud-based computing system platform is safe to use, even if the given cloud-based computing system platform is missing a computing aspect of the comparative (e.g., baseline, standard, or ideal) cloud-based computing system platform, placeholder computing aspect impact level values may be used to determine a normalized or standardized score or other standardized value for computing aspect impact levels.

As such, process 800 can determine the overall-computing aspect impact levels for the associated computing aspects using the computing aspect impact levels of (i) the matching computing aspects and (ii) the placeholder computing aspect impact levels for each respective cloud-based computing system platform of the set of cloud-based computing system platforms (e.g., to which the network operation is processed). For example, the overall-computing aspect impact levels for the matching computing aspects may be determined as described above. The overall-computing aspect impact levels for the computing aspects assigned with a placeholder computing aspect impact level may be assigned or determined to be the respective placeholder computing aspect impact levels. In this way, users are provided with a plethora of security-related information with respect to cloud-based computing system platforms, even when a respective cloud-based computing system platform includes additional computing aspects not included in the set of computing aspects of the comparative cloud-based computing system platform, thereby improving the user experience.

In some implementations, process 800 can determine overall-computing aspect impact levels for associated computing aspects via a machine learning model. For example, similar to determining computing aspect impact levels as described in act 608 of process 600 (FIG. 6), process 800 can apply a blackboard machine learning model to generate the overall-computing aspect impact levels for the associated computing aspects of the second set of computing aspects by using (i) the first set of computing aspects associated with each cloud-based computing system platform (ii) the second set of computing aspects, and (iii) security-vulnerability descriptions obtained from a third-party security entity. For example, the blackboard machine learning model may be advantageous as the blackboard machine learning model may determine how secure a given cloud-based computing system platform is by being consistently updated with security-vulnerability descriptions from third-party security entities, partial solutions to the given problem (e.g., which cloud-based computing system platform is most secure), and the availability of additional information uploaded to the blackboard machine learning model via the plethora of data sources. As such, the blackboard machine learning model may use not only security-vulnerability descriptions, but additional web scraped information pertaining to different cloud-based computing system platforms as well as response data obtained via the processing of the network operation. Using such a robust combination of information, the blackboard machine learning model may parse through the ingested information and determine the overall-computing aspect impact levels for the associated computing aspects. In this way, by using a blackboard machine learning model to generate the overall-computing aspect impact levels for the associated computing aspects, the system may increase the accuracy at which the overall-computing aspect impact levels are determined as missing data is supplemented by additional information resources available by the blackboard machine learning model. Additionally, the blackboard machine learning model is also advantageous to use when determining overall-computing aspect impact levels as new data sources (e.g., agents 104) may be added to the model at any time with no impact to the other data sources or other agents currently implemented. Furthermore, each data source (e.g., agent 104) may also be replaced or removed without compromising the architecture of the blackboard machine learning model or affecting currently implemented data sources or agents. Using the blackboard machine learning model further provides dynamic scalability as the new data sources may be added, removed, changed, or otherwise altered without impacting the functioning of the blackboard machine learning model as data processing loads increases, thereby reducing the amount of computer processing resources required to generate predictions as opposed to traditional machine learning models.

In some implementations, a network component associated with an entity can be configured to process the second network operation via a cloud-based computing system platform associated with a satisfied overall-computing aspect impact level. For example, to facilitate adaptive configuration in real-time (or near real-time) of cloud-based computing system platforms, when it is detected that a given cloud-based computing system platform is either (i) at risk for an attack or (ii) is deemed secure, a network component associated with an entity may be automatically configured to process subsequent (or other) network operations with a cloud-based computing system platform that is deemed "most secure" or "safe to use" based on the overall-computing aspect impact levels. As such, in response to detecting that a given overall-computing aspect impact level for a given associated computing aspect of the set of associated computing aspects satisfied a threshold overall-computing aspect impact level, process 800 can configure a network component associated with the entity to process a second network operation via the cloud-based computing system platform associated with the satisfied overall-computing aspect impact level.

The network component may be a server or part of a server (e.g., sever 306 (FIG. 3)) or other network component associated with the entity. For instance, the entity may be a company, service provider, or other entity that hosts one or more software applications that interact with a cloud-based computing system platform. For example, the entity may be a company, and, as part of the computing architecture the company uses, a controller may be associated with the entity that controls information (e.g., user data, company data, etc.) and which platforms the information is able to access or interact with. In some implementations, when a given cloud-based computing system platform of the set of cloud-based computing system platforms (e.g., used to process the network operation) is associated with a computing aspect that satisfies a threshold overall-computing aspect impact level for a given computing aspect, process 800 may configure the network component to process a second network operation via the cloud-based computing system platform that satisfied the overall-computing aspect impact level for the given computing aspect.

For example, a first cloud-based computing system platform that was used to process the network operation may be associated with a computing aspect of encryption with an overall-computing aspect level of 6. A second cloud-based computing system platform that was used to process the network operation may be associated with a computing aspect of encryption with an overall-computing aspect level of 3. The threshold overall-computing aspect impact level for the computing aspect of encryption may be predetermined at 5. Process 800 may then determine whether the overall-computing aspect impact level for the computing aspect of encryption is satisfied with respect to each of the cloud-based computing system platforms. In some implementations, the overall-computing aspect impact level may satisfy the threshold overall-computing aspect impact level when the overall-computing aspect impact level meets or exceeds the threshold overall-computing aspect impact level. In other implementations, the overall-computing aspect impact level may satisfy the threshold overall-computing aspect impact level when the overall-computing aspect impact level fails to meet or exceed the threshold overall-computing aspect impact level. In this example, where the overall-computing aspect impact level is satisfied when the overall-computing aspect impact level meets or exceeds the threshold computing aspect impact level, the first cloud-based computing system platform may be detected to satisfy the threshold overall-computing aspect impact level, and process 800 may configure the network component to route (or process) a second network operation (or subsequent network operations) using the first cloud-based computing system platform. In this way, the system enables automatic configuration of selecting cloud-based computing system platforms to process network operations when a given computing aspect of the cloud-based computing system platform is deemed safe or otherwise secure, thereby improving the user experience and increasing computer network security.

In some implementations, where multiple given computing aspects satisfy the threshold overall-computing aspect level (e.g., for corresponding computing aspects of a given cloud-based computing system platform), process 800 can configure the network component to process the second network operation based on (i) the amount of satisfied threshold overall-computing aspect impact levels or (ii) weighted satisfied overall-computing aspect levels. For example, process 800 can configure the network component by select the cloud-based computing system platform to process subsequent network operations that has the most amount of satisfied threshold overall-computing aspect impact levels with respect to the other cloud-based computing system platforms used to process the network operation. As another example, as some computing aspects may be deemed more important than others, process 800 may use predetermined weights associated with the computing aspects to determine a weighted average or a weighted sum of the computing aspect impact levels of a given cloud-based computing system platform used to process the network operation. Upon determining the weighted average (or the weighted sum) of the computing aspect impact levels for each cloud-based computing system platform, process 800 can configure the network component by selecting the cloud-based computing system platform with the highest weighted average (or weighted sum) with respect to the other cloud-based computing system platforms used to process the network operation. The system enables automatic configuration of selecting cloud-based computing system platforms to process network operations when a multiple computing aspects of cloud-based computing system platforms are deemed safe or otherwise secure, thereby improving the user experience and increasing computer network security.

In some implementations, process 800 can determine overall mitigated computing aspect impact levels for each associated computing aspect of the set of associated computing aspects. For example, similar to the mitigated computing aspect impact levels determined in act 608 of process 600 (FIG. 6), process 800 can determine overall mitigated computing aspect impact levels for each associated computing aspect of the set of computing aspects with respect to each cloud-based computing system platform. In this way, the system can enable a user to view how specific system protection measures of the entity impact the security vulnerabilities associated with each respective cloud-based computing system platform used to process the network operation, thereby improving the user experience.

At act 810, process 800 can generate for display a graphical layout. For example, process 800 may generate, for display at a Graphical User Interface (GUI), a graphical layout indicating a graphical representation of each overall-computing aspect impact level of the set of associated computing aspects for each respective cloud-based computing system platform of the set of cloud-based computing system platforms. For example, similar to generating the graphical layout in act 610 of process 600 (FIG. 6), process 800 can generate a graphical layout indicating the overall-computing aspect impact levels of the set of associated computing aspects to enable a user to easily compare each cloud-based computing system platform used to process the network operation to one another. For example, the graphical layout may include information pertaining to the cloud-based computing system platforms, including, but not limited to a graphical representation of each overall-computing aspect impact level of each respective computing aspect of the set of computing aspects associated with the respective cloud-based computing system platform, a platform identifier, computing aspect identifiers, graphical representations of mitigated computing aspect impact levels of each respective computing aspect of the set of computing aspects, a key or legend, or other information.

Figure 9:
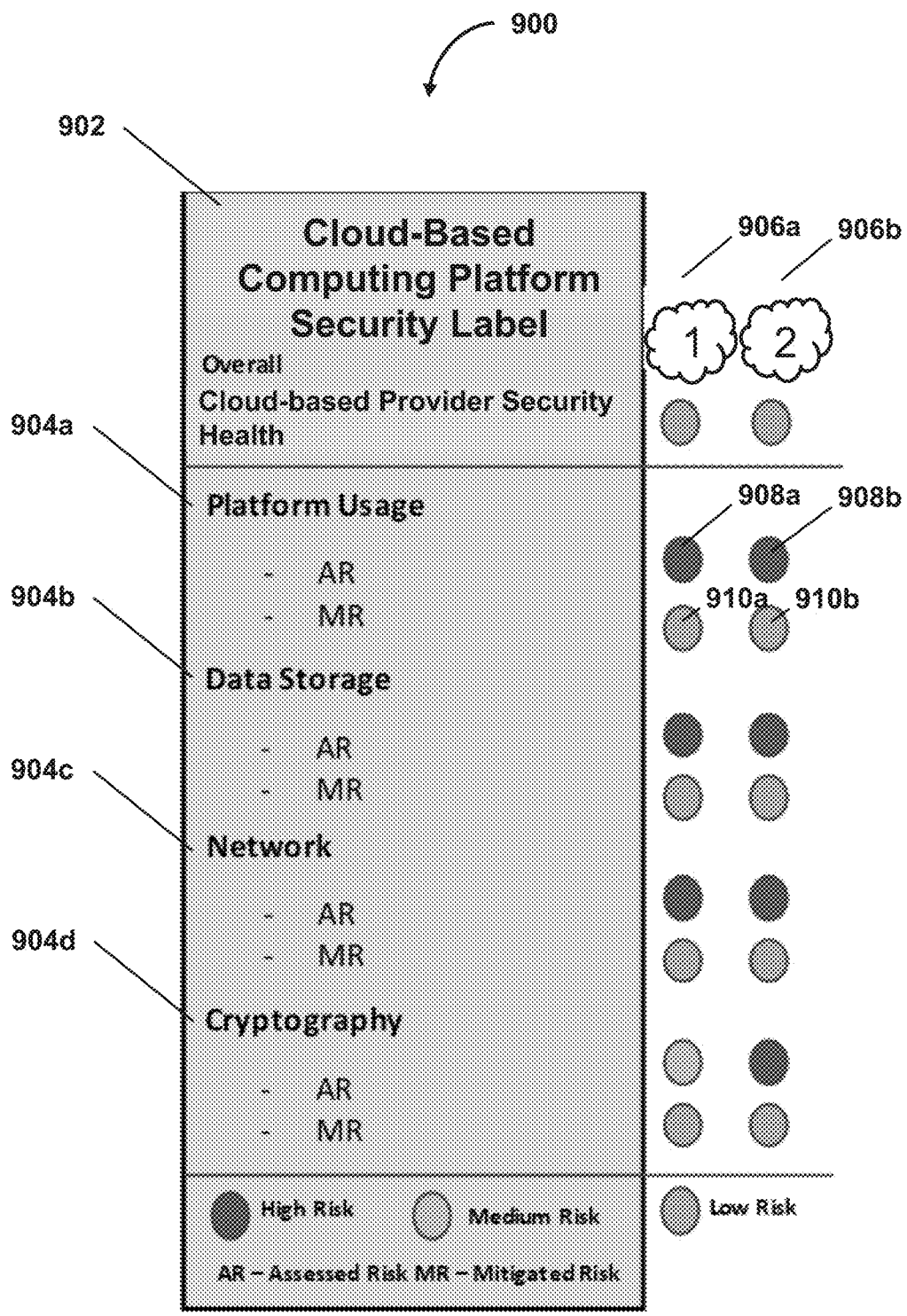
FIG. 9 shows an illustrative representation of a graphical layout for displaying comparative real-time end-to-end security vulnerabilities, in accordance with some implementations of the present technology.

Referring to FIG. 9, FIG. 9 shows an illustrative representation of a graphical layout for displaying comparative real-time end-to-end security vulnerabilities, in accordance with some implementations of the present technology. For example, cloud-based computing platform security label 900 can include a cloud-based computing platform security label identifier 902, computing aspect identifiers 904*a-d*, cloud-based computing system platform identifiers 906*a-b*, and overall-computing aspect impact level representations 908*a-b*. The cloud-based computing platform security label identifier 902 can convey information to a user that the user is viewing a cloud-based platform specific security label. Overall-computing aspect identifiers 904*a-d* may indicate the respective computing aspects that are associated with the respective cloud-based computing platforms to which the network operation is processed on. For example, the overall-computing aspect identifiers 904*a-d* may be the same or similar to the associated computing aspects as determined in act 808 of process 800 (FIG. 8). Additionally, cloud-based computing system platform identifiers 606*a-b* may be the same or similar to the cloud-based computing system platforms used to process the network operation as determined in act 802 of process 800 (FIG. 8). overall-computing aspect impact level representations 908*a-b* and 910*a-b* may indicate a graphical representation of the determined overall-computing aspect impact levels/mitigated computing aspect impact levels as determined in act 808 of process 800 (FIG. 8). As shown, overall-computing aspect impact level representations 908*a-b*, overall mitigated computing aspect impact level representations 910*a-b* may indicate a qualitative graphical representation of a respective computing aspect impact level as determined in act 808. For example, although FIG. 9 shows the overall/mitigated computing aspect impact level representations 908*a-b*, 910*a-b*, as color coded shapes, other graphical representations may be used in accordance with some implementations of the present technology, such as, but not limited to, numerical values (e.g., integers, decimals, percentages, ratios, etc.), alphanumeric strings (e.g., "high," "medium," "low," etc.), hexadecimal values, binary values, or other graphical representations of the computing aspect impact levels.

As shown in FIG. 9, cloud-based computing system platform identifiers 806*a-b* can correspond to the set of cloud-based computing system platforms used to process the network operation. To provide a network engineer or other user an improved user interface to enable easy understanding of which cloud-based computing system platform is the most secure, the cloud-based computing platform security label 900 enables a side-by-side comparison of associated computing aspects. For example, first cloud-based computing system platform 906*a* and second cloud-based computing system platform 906*b* are displayed side-by-side enabling the user to quickly view the "strengths" and "weaknesses" of each cloud-based computing system platform, and also enabling the user to efficiently select a given cloud-provider to process subsequent network operations based on the real-time or near real-time collection of information pertaining to current security vulnerabilities affecting each cloud-based computing system platform. It should be noted that the functionalities and display views, although not shown in FIG. 9, may be similar to that as described with respect to act 610 of process 600 (FIG. 6) and that of FIG. 7, albeit, with respect to associated computing aspects (e.g., associated assessment-domains) of the second set of computing aspects.

Figure 10:
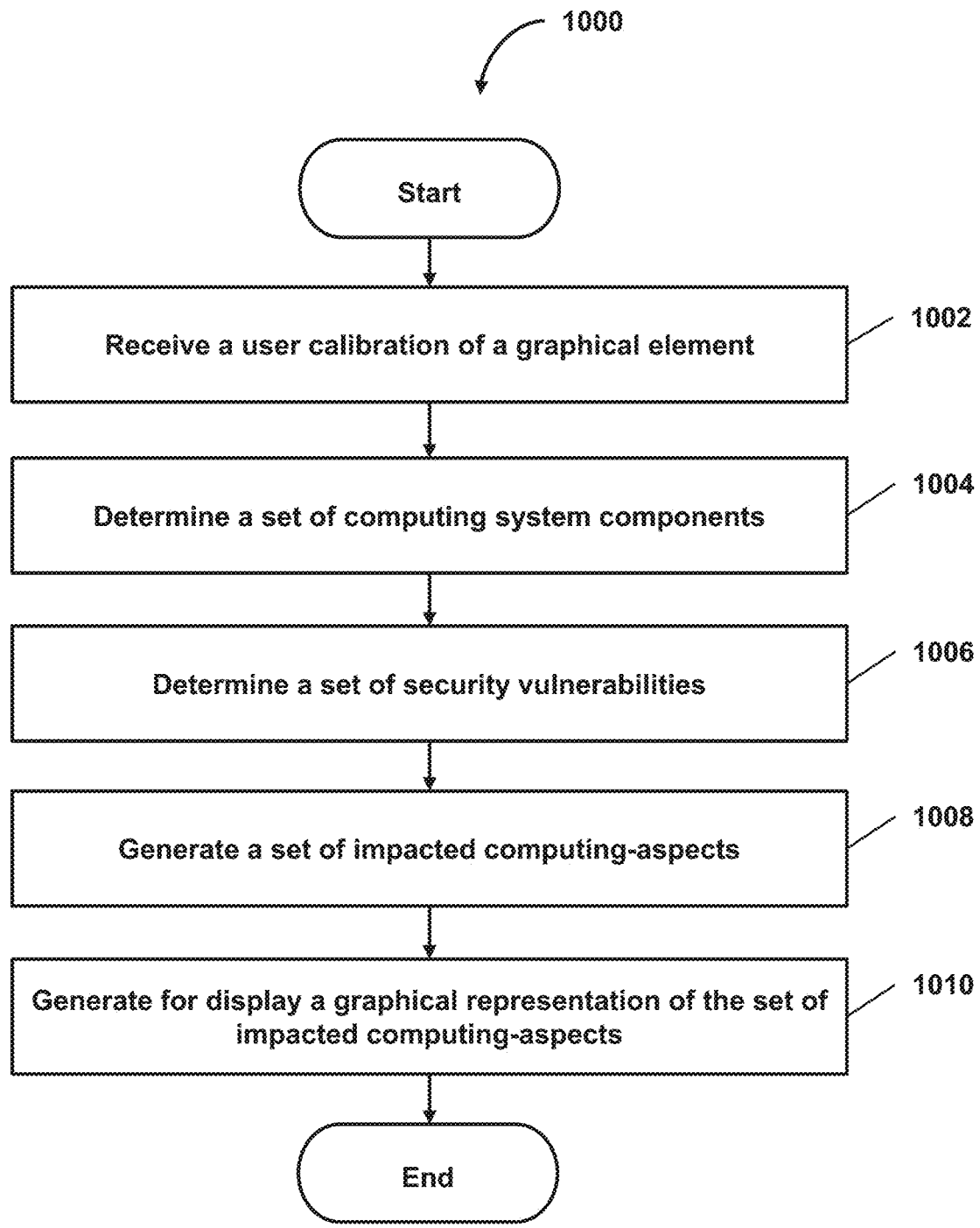
FIG. 10 is a flow diagram illustrating a process of providing user-induced variable identification of end-to-end computing system security impact information via a user interface, in accordance with some implementations of the present technology.

Providing User-Induced Variable Identification of End-to-End Computing System Security Impact Information FIG. 10 is a flow diagram illustrating a process of providing user-induced variable identification of end-to-end computing system security impact information via a user interface, in accordance with some implementations of the present technology.

At act 1002, process 1000 can receive a user calibration of a graphical element. For example, process 1000 receives, at a graphical user interface (GUI), a user calibration of a graphical security vulnerability element. The user calibration is indicative of an adjustment to the graphical security vulnerability element to a position indicative of a security condition related to identifying impacted computing aspects of computing system threats.

For example, the security condition can be a condition that is set by the user to obtain security vulnerability information regarding a given computing system platform, computing system architecture, or other computing system. The security condition can indicate a number of impacted computing-aspects the user would like to view (e.g., a top 3, top 5, top 10, etc., of impacted computing-aspects/assessment-domains), a number of security vulnerabilities for each impacted computing-aspects/assessment-domains, a number of mitigation actions for each impacted computing-aspects/ assessment-domains), a number of ranked impacted computing-aspects based on a threat value, computing-aspect impact level, or other threat metric, or other security condition. As opposed to existing systems that require complex security-attribute selection to view computing system threat information of a computing system, the system enables a user to quickly adjust an amount of information they want to view regarding security vulnerabilities. By doing so, a user is not inundated with a large amount of complex security vulnerability information which can cause a user (e.g., network engineer) to miss valuable or otherwise critical computing system security-related information. As such, the system provides an improved user interface and improved user experience via a variably adjustable graphical security vulnerability element.

Figure 11A:
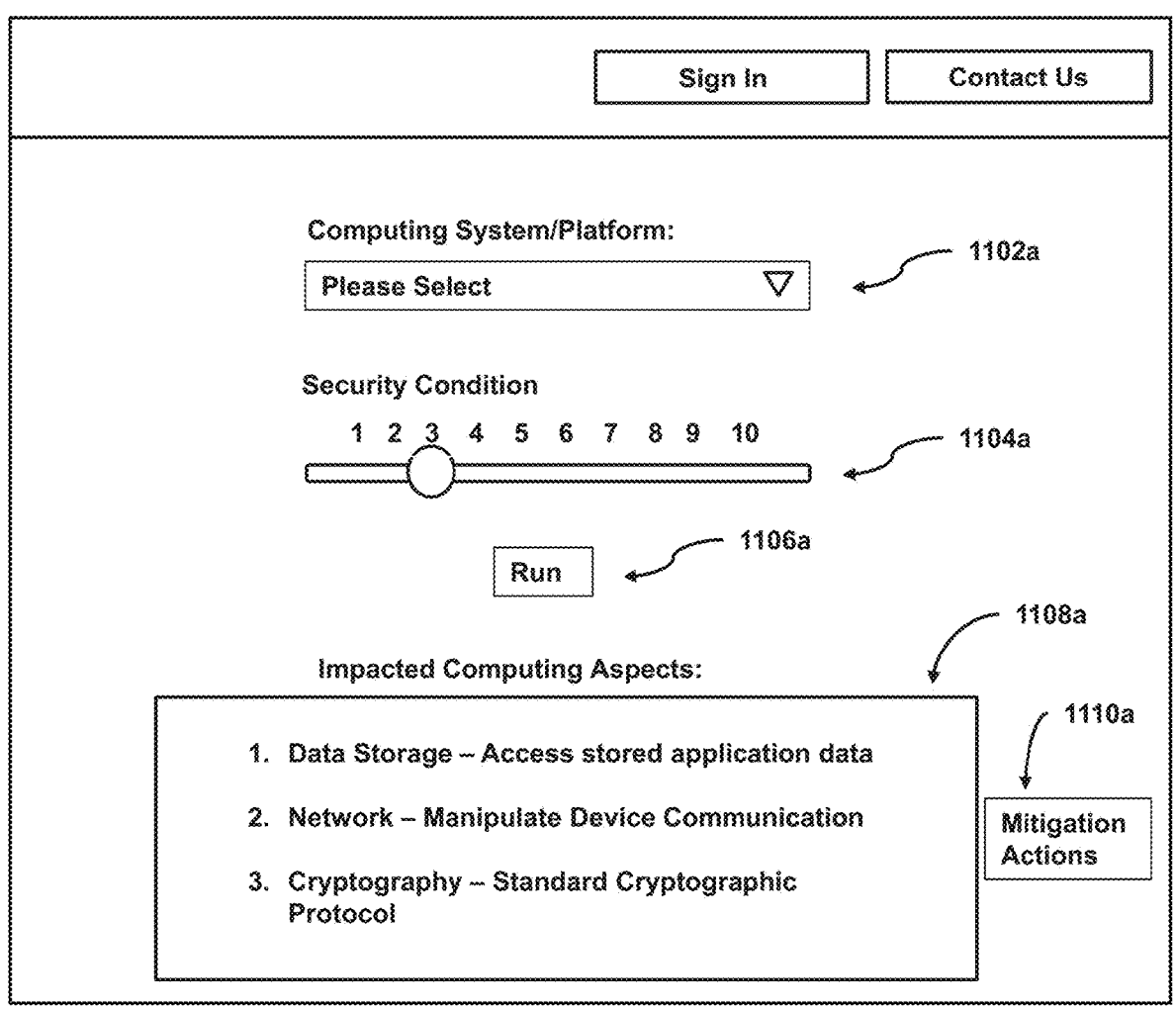
FIGS. 11A-11C shows illustrative GUIs for providing a user calibration of a graphical security vulnerability element, in accordance with some implementations of the present technology.

Referring to FIG. 11A, for example, a user interacts with GUI 1100a to adjust the graphical security vulnerability element. GUI 1100a can include computing system/platform selector 1102a, graphical security vulnerability element 1104a, run button 1106a, results 1108a, and selection button 1110a. Computing system/platform selector 1102a enables a user to select one or more computing systems or computing platforms they wish to analyze. For instance, the computing systems or computing platforms can be the same or similar to the computing systems/platforms as described in process 600 and/or 800. The computing systems or computing platforms can include a set of computing system components such as load balancers, fire walls, servers, routers, or other computing system components that are each associated with their own hardware and software requirements. As such, security vulnerabilities may exist within each component due to the various configurations. Attackers (e.g., malicious entities, hackers, etc.) may leverage this fact to exploit user or system data. Thus, users may want to analyze one or more computing systems or computing system platforms to determine which computing-aspects are or are not impacted by security vulnerabilities in real time.

Figure 11B:
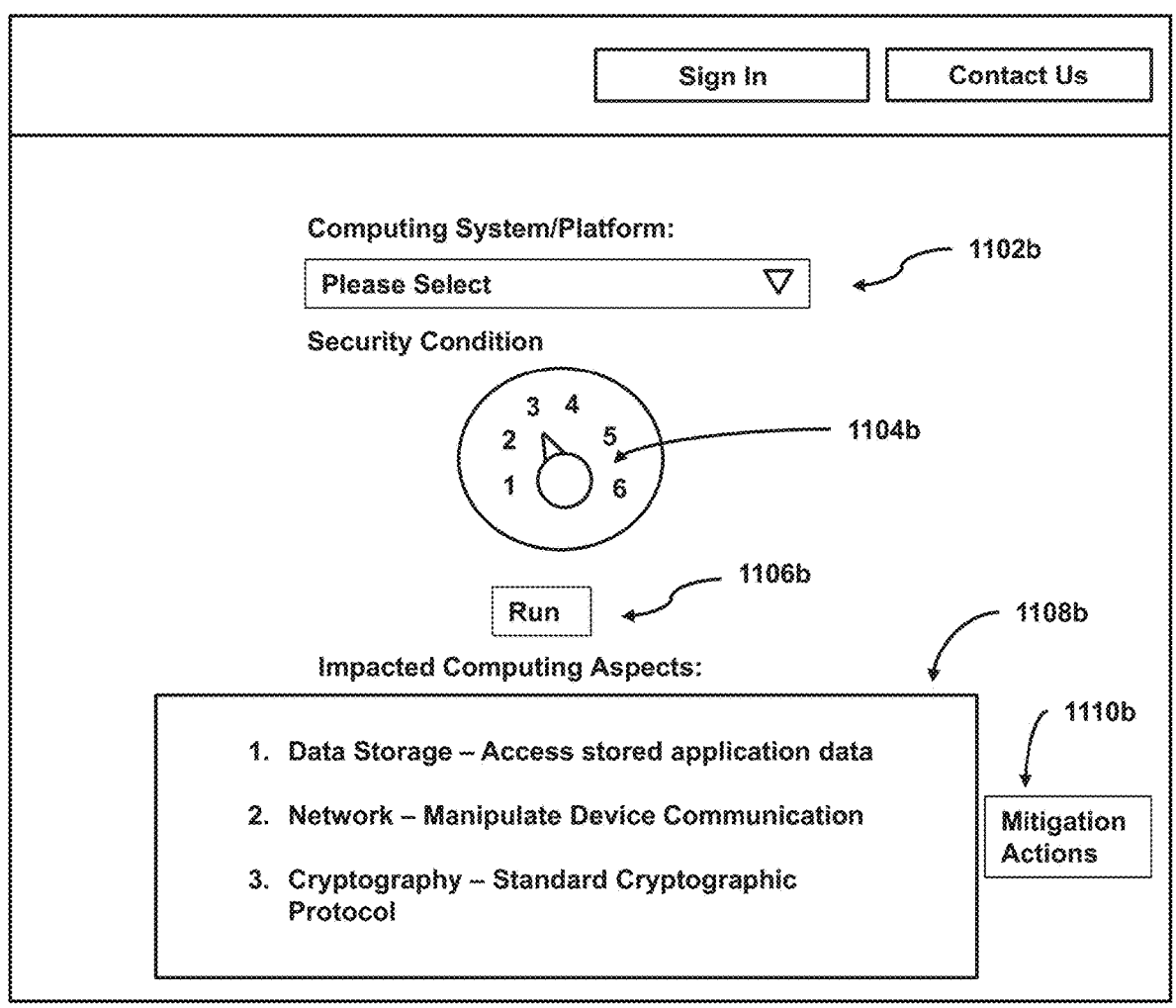

Graphical security vulnerability element 1104a can enable a user to calibrate, select, adjust, or chose a security condition related to identifying impacted computing-aspects (e.g., assessment domains). Such impacted computing-aspects can be impacted by one or more computing system threats (e.g., based on one or more components of the given computing system/platform). As shown in FIG. 11A, graphical security vulnerability element 1104a is shown as a graphical component along a slidable bar. For example, a user may slide the graphical component to a position that indicates a number of impacted computing aspects the user wishes to view. As shown in FIG. 11B, graphical security vulnerability element 1104b is shown as a dial. For example, a user may adjust the dial to a position that indicates a number of impacted computing aspects the user wishes to view. Although the graphical security vulnerability elements 1104a and 1104b are configured to enable a user to indicate an amount of impacted computing aspects to view, other configurations may exist as described above, and the graphical component/sliding bar and dial are not limiting, but merely exemplary. The graphical security vulnerability element 1104a and 1104b can take the form of other shapes, sizes, elements, text boxes, data fields, or other graphical elements configured to enable a user to adjust one or more attributes/positions of the graphical element, in accordance with some implementations of the present technology.

Referring back to FIG. 11A, GUI 1100a also includes run button 1106a. Run button 1106a can enable the system to analyze the selected computing system/platform for impacted computing-aspects. For example, when a user selects run button 1106a, the process 1000 is triggered to perform one or more of acts 1004-1010. Results 1108a may indicate one or more results of analyzing the selected computing system/platform. For instance, results 1108a displays a set of impacted computing-aspects (e.g., Data Storage, Network, Cryptography) and details related to what is impacting the respective impacted computing-aspects (e.g., Access stored application data, manipulate device communication, standard cryptographic protocol). It should be noted, that results 1108a can display the set of impacted computing-aspects alone, with the details related to what is impacting the respective impacted computing-aspects, or with/without other information, in accordance with some implementations of the present technology.

Figure 11C:
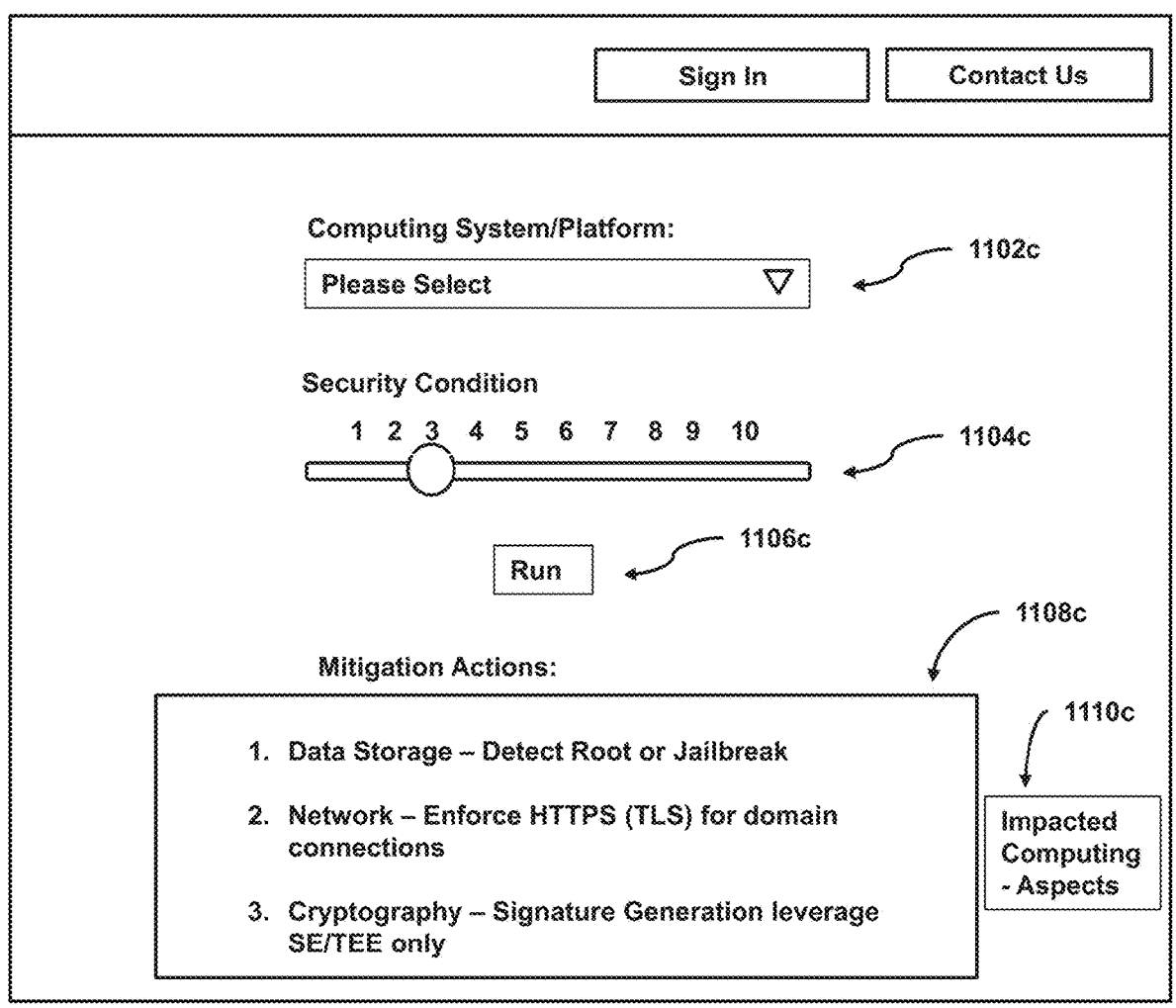

Selection button 1110a can enable an updated view of results 1108a. For example, when a user selects selection button 1110a, results 1108a can be updated to display an updated results 1108c (FIG. 11C), which shows the set of impacted computing aspects and one or more mitigation actions to be taken (e.g., detect root or jailbreak, enforce HTTPS (TLS) for domain connections, signature generation leverage SE/TEE only). It should be noted, that results 1108c can display the set of impacted computing-aspects alone, with the respective mitigation actions, or with/without other information, in accordance with some implementations of the present technology. When the user selects selection button 1110a, GUI 1100c is updated, and can display results button 1110c to enable a user to change the information which is presented (e.g., impacted computing-aspects, impacted computing-aspects and details to what is impacting the respective impacted computing-aspects, mitigation actions, impacted computing-aspects and mitigation actions, etc.). Additionally, it should be noted that computing system/platform selector 1102a may correspond to computing system/platform selector 1102b-1102c, graphical security vulnerability element 1104a may correspond to graphical security vulnerability element 1104b-1104c, run button 1106a may correspond to run button 1108b-1108c, results 1108a may correspond to results 1108b, and selection button 1110a may correspond to selection button 1110b, in accordance with some implementations of the present technology.

At act 1004, process 1000 can determine a set of computing system components. To determine real-time (or near-real time) security vulnerabilities associated with computing system components of a given computing system/platform, process 1000 transmits a network operation through computing system to determine which computing system components are being utilized within the computing system/ platform. For instance, process 1000 transmits a network operation from a mobile device to a remote device (e.g., another device that communicates via one or more components of the computing system, another computing system/ platform, within the same computing system/platform, etc.). Similar to the test operation described in act 802 above, process 1000 transmits a network operation to obtain security-response data from each computing system component that processes data associated with the transmission of the network operation. The network operation can include test information such as the time, date, a request for additional information related to the security of a given computing system/computing platform/computing system component, a status request of current operations of the computing system/platform, or other information to determine a given operating status of the computing system/platform. Additionally or alternatively, the network operation can include test information that queries, requests, pings, executes a script, or otherwise interacts with a computing system/platform to obtain security-related information from the computing system/platform. Transmitting the network operation enables computing system components of the computing system to process data associated with the transmission of the network operation.

When the network operation is transmitted (or alternatively transferred over the computing system/platform), security-response data from each computing system component of the set of computing system components can be received by the system. For example, the security-response data can include security-attributes, such as configuration profiles, serial numbers of a computing system component, identifier of a computing system component, software version information being executed on a computing system component, logging information, currently implemented security protocols (e.g., encryption methods, data storage protocols, communication protocols, etc.), standards, or other information indicative of security-related information of a respective computing system component. In this way, the system obtains real-time security-related information of cloud-based computing system platforms, thereby detecting newly discovered security-vulnerabilities that otherwise may not be detected for an extended period of time.

At act 1006, process 1000 can determine a set of security vulnerabilities. For example, process 1000 determines a set of security vulnerabilities associated with each computing system component of the set of computing system components using a third-party resource. The third-party resource can be the same or similar to third-party security entity as described in act 604 (FIG. 6). For example, a third-party security entity can be an entity that observes security vulnerabilities within a multitude of software applications, platforms, or other computing components. As an example, third-party security entities may be Mitre®, NIST®, or other industry standard or trusted security entities. Such security entities can provide security-vulnerability descriptions, security vulnerabilities, or other security information that each indicate one or more security threats, attack vectors, TTPs, security-vulnerability responses, or other security-vulnerability-related information pertaining to one or more computing components and/or computing aspects associated with the one or more computing components.

In some implementations, process 1000 can determine the set of security vulnerabilities associated with each computing system component of the set of computing system components using the security-response data received from each computing system component. For example, where the security-response data indicates identifying information related to the computing system component involved with the transmission of the network operation (e.g., serial numbers, software version identifiers, etc.), process 1000 can query the third-party resource (e.g., with the security-response data) to determine whether a security vulnerability currently impacts a given computing system component. In this way, the system obtains real-time, accurate, security vulnerabilities impacting computing system components within a computing system/platform.

In some implementations, process 1000 can determine the set of security vulnerabilities associated with each computing system component of the set of computing system components using the third-party resource alone. Where no security-response data is received by the system (e.g., due to computing system components not being configured to respond to security-related requests, pings, etc.), the system can use the third-party resource to identify known security vulnerabilities impacting computing system components. Process 1000 can query the third-party resource with known computing system component identifying information to determine the set of security vulnerabilities. For example, where the computing system/platform to be analyzed is a known computing system/platform (e.g., a company or other entity controls the computing system/platform), the entity may store identifying information regarding which hardware and software combinations are part of the computing system/platform. Using such information, process 1000 determines the set of security vulnerabilities associated with each computing system component of the set of computing system components using the third-party resource, thereby ensuring that accurate security vulnerabilities are obtained even when the respective computing system components are not configured to transmit security-response information.

At act 1008, process 1000 can generate a set of impacted computing-aspects. For example, process 1000 applies a decision engine to generate a set of impacted computing-aspects associated with the set of computing system components using the set of security vulnerabilities. The decision engine can be a rules engine, Neural Network (NN), Support Vector Machine (SVM), Convolutional Neural Network (CNN), Recurrent Neural Network (RNN), decision tree, deep learning model, Bayesian classifier, Bayesian model, random forest model, k-nearest neighbors algorithm, linear discriminant analyzer, learning vector quantization model, k-means clustering model, blackboard machine learning model, or other decision making model or prediction model. The decision engine can be trained on a set of training data to generate a set of impacted computing-aspects associated with the set of computing system components using the set of security vulnerabilities.

In some implementations, process 1000 provides the set of security vulnerabilities as input to the decision engine. The decision engine generates the set of impacted computing-aspects associated with the set of computing system components. For example, the decision engine outputs a set of impacted computing-aspects (e.g., assessment-domains) that are related to the determined set of security vulnerabilities. The output can be a set of impacted computing-aspects that are impacted by one or more security vulnerabilities. For instance, multiple computing-aspects can be impacted by one security vulnerability, multiple computing-aspects can be impacted by multiple security vulnerabilities, one computing-aspect can be impacted by one security vulnerability, or one computing-aspect can be impacted by multiple security vulnerabilities.

It is advantageous to use a decision engine when determining impacted computing-aspects due to the complexity involved with complex cybersecurity jargon associated with security vulnerability descriptions of security vulnerabilities. As opposed to existing systems that rely on the mere opinion of users to determine which aspects of a computing system is impacted, the decision engine standardizes such determinations and learns from a robust resource of training information. Furthermore, using a decision engine reduces the amount of time for determining whether one or more computing-aspects of a computing system are impacted by security threats, thereby increasing network security as vulnerabilities and impacted computing-aspects are found more efficiently.

In other implementations, and similar to the process discussed in act 604 (FIG. 6) and act 804 (FIG. 8), process 1000 can use the computing-aspect-mapping structure to determine the set of impacted computing-aspects. For example, as the computing-aspect-mapping structure includes security vulnerability descriptions mapped to a given computing aspect, process 1000 leverages the computing-aspect-mapping structure to determine the set of impacted computing-aspects. For example, process 1000 may parse the computing-aspect mapping structure to determine which determined security vulnerabilities correspond (or are otherwise associated with) computing-aspects. In this way, the system reduces the amount of computer processing resources used to determine impacted computing-aspects due to a simple parsing of the computing-aspect-mapping structure.

At act 1008, process 1000 can generate for display a graphical representation of the set of impacted computing-aspects. For example, process 1000 generates for display at the GUI, a graphical representation of the set of impacted computing-aspects satisfying the security condition of the user calibration. Referring to FIG. 11A, process 1000 generates a graphical representation of the set of impacted computing-aspects in results 1108a. The set of impacted computing-aspects may satisfy the security condition of the user calibration. The set of impacted computing-aspects may satisfy the security condition based on what the security condition is specifying. For instance, where the security condition indicates a number of impacted computing-aspects a user would like to view, process 1000 displays the specified number of impacted computing-aspects. The security condition in such case may be satisfied where the specified number of the user calibration matches the number of computing-aspects displayed. In some implementations, where the security condition indicates a number of ranked impacted computing-aspects (e.g., the user would like to view the top 3 most impacted computing-aspects with respect to computing-aspect impact levels), process 1000 can display the top 3 most impacted computing-aspects. The security condition in such case may be satisfied where the specified number of the user calibration matches the number most impacted computing-aspects displayed. For instance, similar to the process described in act 608 (FIG. 6), process 1000 may determine computing aspect-impact levels for each impacted computing-aspect of the set of impacted computing-aspects. Using the computing-aspect impact levels, process 1000 can compare the computing-aspect impact levels to each other (e.g., for respective impacted computing-aspects) and display the top 3 most impacted computing-aspects in a ranked order. In this way, a user is presented with security vulnerability information related to which computing-aspects are impacted by one or more security vulnerabilities, thereby improving the user experience while enabling identification of impacted computing-aspects of a computing system/platform.

In some implementations, process 1000 can also generate for display additional information associated with the set of impacted computing aspects. For example, as shown in FIG. 11A in results 1108a, process 1000 generates for display one or more security vulnerabilities associated with each impacted computing aspect. Each impacted computing-aspect (e.g., data storage, network, cryptography, or other computing-aspects) can be associated with one or more security vulnerabilities, and process 1000 can display such security vulnerability information to enable a user to quickly identify security exploits affecting the computing system/platform. Additionally or alternatively, where the security condition indicates a number of security vulnerabilities a user would like to view with respect to an impacted computing-aspect, process 1000 can generate for display the indicated number of security vulnerabilities. In some implementations, where the security vulnerabilities are associated with a threat values (e.g., as described in act 608 (FIG. 6)), process 1000 can display a ranked set of security vulnerabilities based on the respective threat value of each security vulnerability. For instance, process 1000 may compare threat values for security vulnerabilities associated with a respective computing-aspect to display the top 3 highest-risk security vulnerabilities. In this way, the system provides additional security vulnerability information to a user, thereby improving the user experience while enabling identification of the most threatening security vulnerabilities.

In some implementations, process 1000 can update the graphical representation of the set of impacted computing aspects. Process 1000 can receive, at the GUI, a second user calibration of the graphical security vulnerability element to a second position indicative of the security condition related to identifying security vulnerabilities. For example, a user may adjust the graphical security element to view more or less impacted computing aspects. In response to receiving the second user calibration of the graphical security vulnerability element, process 1000 updates the graphical representation of the set of impacted computing-aspects satisfying the security condition of the second user calibration. For example, where the user adjusts the graphical security vulnerability element to see five impacted computing-aspects, process 1000 can display (e.g., by refreshing the screen) the updated set of impacted computing-aspects. In this way, a user can variably adjust the current view of security vulnerability information impacting a given computing system/platform, thereby improving the user experience.

In some implementations, process 1000 can configure a network component to apply a security mitigation action. For example, process 1000 applies a decision engine to generate a set of security mitigation actions using (i) the set of impacted computing-aspects and (ii) the set of security vulnerabilities. Each security mitigation action of the set of security mitigation actions is associated with a respective impacted computing-aspect and a respectively corresponding security vulnerability. For instance, as each impacted computing-aspect may be impacted by one or more security vulnerabilities, existing systems for determining which mitigation action will be most effective is an unstandardized system relying solely on the opinion of one or more network engineers. Although network engineers can be highly trained, mitigating security vulnerabilities is an extremely complex and cumbersome task to accomplish. Due to the complex jargon and intricacies of security vulnerabilities affecting different computing-aspects or other related security vulnerabilities, network engineers must perform a vast amount of research, wasting valuable time and computing processing resources attempting to resolve a security vulnerability for a given computing-aspect of a computing system/platform.

To enable an efficient, effective, and standardized method for determining security mitigation actions, process 1000 provides the set of impacted computing-aspects and the set of security vulnerabilities to the decision engine to generate the set of security mitigation actions. Similar to the process described in act 608 (FIG. 6), process 1000 can then determine a computing-aspect impact level for each impacted computing-aspect of the set of impacted computing-aspects. In response to the computing-aspect impact level for a respective impacted computing-aspect of the set of impacted computing-aspects satisfying a threshold computing-aspect impact level, process 1000 configures a network component to apply a respective security mitigation action to one or more computing system components associated with the impacted computing-aspect. The computing-aspect impact level may satisfy the computing-aspect impact threshold level where the computing-aspect impact level meets or exceeds the computing-aspect impact threshold level (e.g., indicating that the respective computing-aspect is highly impacted by one or more security vulnerabilities).

The network component can be a server or part of a server (e.g., sever 306 (FIG. 3)) or other network component associated with an entity. For instance, the entity may be a company, service provider, or other entity that hosts or is otherwise in control of/associated with the computing system/platform. For example, the entity may be a company, and, as part of the computing architecture the company uses, a controller may be associated with the entity that controls information (e.g., user data, company data, etc.) and which platforms the information is able to access or interact with. The network component may use the generated set of security mitigation actions and apply such security mitigation actions to the computing system/platform automatically. For instance, as opposed to existing systems that require a network engineer to re-write code or implement new security protocols, the network component may implement the identified security mitigation action (e.g., for a respective impacted computing-aspect and corresponding security vulnerability) in response to the computing-aspect impact level satisfying the computing-aspect impact threshold level. In this way, the system improves computing system security by mitigating security vulnerabilities in real-time.

In some implementations, process 1000 can generate for display the set of security mitigation actions. For example, upon generating the set of security mitigation actions, process 1000 can update GUI 1100*a* to enable a user to view the set of security mitigation actions. For instance, referring to FIG. 11A, a user may select selection button 1110*a* to view the set of mitigation actions. When the user selects selection button 1110*a*, GUI 1100*a* is updated to GUI 1100*c* of FIG. 11C. As shown in results 1108*c*, process 1000 displays the set of mitigation actions (e.g., detect root or jailbreak, enforce HTTPS (TLS) for domain connections, Signature Generation leverage SE/TEE only, etc.) as well as the respectively corresponding impacted computing-aspects (data storage, network, cryptography, etc.). In some implementations, process 1000 can display one or more security mitigation actions corresponding to a given impacted computing-aspect. It should be noted, that although only three impacted computing-aspects and three corresponding security mitigation actions are shown, more or less of computing-aspects and corresponding security mitigation actions may be displayed, in accordance with some implementations of the present technology. In this way, the user experience is improved as users can quickly identify which remedies are available to correct security vulnerabilities, thereby improving computing system/platform security.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A system for providing variable identification of end-to-end computing system security impact information via user interfaces, the system comprising:
   at least one processor; and
   at least one memory coupled to the at least one processor and storing instructions that, when executed by the at least one processor, perform operations comprising:
   receiving, at a user interface, a user calibration of a security vulnerability element, wherein the user calibration adjusts the security vulnerability element to a position indicative of a security condition related to identifying impacted assessment domains of computing system threats;
   determining, based on a processing of a network operation from a first device to a second device, a set of computing system components that are associated with the processing of the network operation;
   receiving response data from each computing system component of the set of computing system components associated with one or more security-attributes of the respective computing system component;
   determining a set of security vulnerabilities associated with each computing system component of the set of computing system components using (i) a third-party resource and (ii) the response data;
   applying a model to generate a set of impacted assessment domains associated with the set of computing system components using the set of security vulnerabilities; and
   generating for display at the user interface, a visual representation of the set of impacted assessment domains satisfying the security condition of the user calibration.

2. The system of claim 1, further storing instructions that, when executed by the at least one processor, perform operations comprising:
   training the model on training data comprising a set of labeled feature vectors, wherein each labeled feature vector of the set of labeled feature vectors indicates labels of (i) a given security vulnerability, (ii) a given computing system component, and (iii) a given impacted assessment domain.

3. The system of claim 1, further storing instructions that, when executed by the at least one processor, perform operations comprising:
   applying a second model to generate a set of security mitigation actions using (i) the set of impacted assessment domains and (ii) the set of security vulnerabilities, wherein each security mitigation action of the set of security mitigation actions is associated with a respective impacted assessment domain and a respectively corresponding security vulnerability;
   determining an assessment domain impact level for each impacted assessment domain of the set of impacted assessment domains; and
   in response to the assessment domain impact level for a respective impacted assessment domain of the set of impacted assessment domains satisfying a threshold assessment domain impact level, configuring a network component to apply a respective security mitigation action to one or more computing system components associated with the respective impacted assessment domain.

4. The system of claim 3, further storing instructions that, when executed by the at least one processor, perform operations comprising:
   training the second model on second training data comprising a second set of labeled feature vectors, wherein each labeled feature vector of the second set of labeled feature vectors indicates labels of (i) a given impacted assessment domain, (ii) a given security vulnerability, and (iii) a given security mitigation action.

5. The system of claim 4, wherein the given security mitigation action is based on a platform-specific policy.

6. The system of claim 1, further storing instructions that, when executed by the at least one processor, perform operations comprising:
   receiving, at the user interface, a second user calibration of the security vulnerability element, wherein the second user calibration adjusts the security vulnerability element to a second position indicative of the security condition related to identifying security vulnerabilities; and
   in response to receiving the second user calibration of the security vulnerability element, updating the visual representation of the set of impacted assessment domains satisfying the security condition of the second user calibration.

7. The system of claim 1, wherein the response data is security-response data received in response to the processing of the network operation.

8. A method for providing user-induced variable identification of end-to-end computing system security impact information via user interfaces, the method comprising:
   receiving a user calibration of a security vulnerability element, wherein the user calibration adjusts the security vulnerability element to a position indicative of a security condition related to identifying impacted computing-aspects of computing system threats;
   determining, based on a processing of a network operation associated with a computing system, a set of computing system components that are associated with the processing of the network operation;
   determining a set of security vulnerabilities associated with each computing system component of the set of computing system components using a third-party resource;
   generating a set of impacted computing-aspects associated with the set of computing system components using the set of security vulnerabilities; and
   generating for display at a user interface, a visual representation of the set of impacted computing-aspects satisfying the security condition of the user calibration.

9. The method of claim 8, further comprising:
   training a model on training data comprising a set of labeled feature vectors, wherein each labeled feature vector of the set of labeled feature vectors indicates labels of (i) a given security vulnerability, (ii) a given computing system component, and (iii) a given impacted computing-aspect; and
   generating the set of impacted computing-aspects associated with the set of computing system components, via the model, using the set of security vulnerabilities.

10. The method of claim 8, further comprising:
applying a model to generate a set of security mitigation actions using (i) the set of impacted computing-aspects and (ii) the set of security vulnerabilities, wherein each security mitigation action of the set of security mitigation actions is associated with a respective impacted computing-aspect and a respectively corresponding security vulnerability;
determining an computing-aspect impact level for each impacted computing-aspect of the set of impacted computing-aspects; and
in response to the computing-aspect impact level for a respective impacted computing-aspect of the set of impacted computing-aspects satisfying a threshold computing-aspect impact level, configuring a network component to apply a respective security mitigation action to one or more computing system components associated with the respective impacted computing-aspect.

11. The method of claim 10, further comprising:
training the model on second training data comprising a second set of labeled feature vectors, wherein each labeled feature vector of the second set of labeled feature vectors indicates labels of (i) a given impacted computing-aspect, (ii) a given security vulnerability, and (iii) a given security mitigation action.

12. The method of claim 8, further comprising:
receiving, at the user interface, a second user calibration of the security vulnerability element, wherein the second user calibration adjusts the security vulnerability element to a second position indicative of the security condition related to identifying security vulnerabilities; and
in response to receiving the second user calibration of the security vulnerability element, updating the visual representation of the set of impacted computing-aspects satisfying the security condition of the second user calibration.

13. The method of claim 8, wherein security-response data is received in response to the processing of the network operation and used to further determine the set of security vulnerabilities.

14. One or more non-transitory computer-readable medium comprising instructions that, when executed by one or more processors, cause operations comprising:
receiving a user calibration of a security vulnerability element, wherein the user calibration adjusts the security vulnerability element to a position indicative of a security condition related to identifying impacted computing-aspects of computing system threats;
determining, based on a processing of a network operation associated with a computing system, a set of computing system components that are associated with the processing of the network operation;
determining a set of security vulnerabilities associated with each computing system component of the set of computing system components using a third-party resource;
generating a set of impacted computing-aspects associated with the set of computing system components using the set of security vulnerabilities; and
generating for display at a user interface, a visual representation of the set of impacted computing-aspects satisfying the security condition of the user calibration.

15. The medium of claim 14, wherein the operations further comprise:
training a model on training data comprising a set of labeled feature vectors, wherein each labeled feature vector of the set of labeled feature vectors indicates labels of (i) a given security vulnerability, (ii) a given computing system component, and (iii) a given impacted computing-aspect; and
generating the set of impacted computing-aspects associated with the set of computing system components, via the model, using the set of security vulnerabilities.

16. The medium of claim 14, wherein the operations further comprise:
applying a model to generate a set of security mitigation actions using (i) the set of impacted computing-aspects and (ii) the set of security vulnerabilities, wherein each security mitigation action of the set of security mitigation actions is associated with a respective impacted computing-aspect and a respectively corresponding security vulnerability;
determining an computing-aspect impact level for each impacted computing-aspect of the set of impacted computing-aspects; and
in response to the computing-aspect impact level for a respective impacted computing-aspect of the set of impacted computing-aspects satisfying a threshold computing-aspect impact level, configuring a network component to apply a respective security mitigation action to one or more computing system components associated with the respective impacted computing-aspect.

17. The medium of claim 16, wherein the operations further comprise:
training the model on second training data comprising a second set of labeled feature vectors, wherein each labeled feature vector of the second set of labeled feature vectors indicates labels of (i) a given impacted computing-aspect, (ii) a given security vulnerability, and (iii) a given security mitigation action.

18. The medium of claim 17, wherein the given security mitigation action is based on a platform-specific policy.

19. The medium of claim 14, wherein the operations further comprise:
receiving, at the user interface, a second user calibration of the security vulnerability element, wherein the second user calibration adjusts the security vulnerability element to a second position indicative of the security condition related to identifying security vulnerabilities; and
in response to receiving the second user calibration of the security vulnerability element, updating the visual representation of the set of impacted computing-aspects satisfying the security condition of the second user calibration.

20. The medium of claim 14, wherein security-response data is received in response to the processing of the network operation and used to further determine the set of security vulnerabilities.

* * * * *